United States Patent
Simon

(10) Patent No.: US 9,487,286 B2
(45) Date of Patent: Nov. 8, 2016

(54) LIFT AND PROPULSION DEVICE, AND HEAVIER-THAN-AIR AIRCRAFT PROVIDED WITH SUCH A DEVICE

(76) Inventor: Jean-Michel Simon, Chatillon (FR)

( * ) Notice: Subject to any disclaimer, the term of this patent is extended or adjusted under 35 U.S.C. 154(b) by 893 days.

(21) Appl. No.: 13/513,532

(22) PCT Filed: Nov. 29, 2010

(86) PCT No.: PCT/FR2010/052564
§ 371 (c)(1),
(2), (4) Date: Jun. 1, 2012

(87) PCT Pub. No.: WO2011/067527
PCT Pub. Date: Jun. 9, 2011

(65) Prior Publication Data
US 2012/0237341 A1    Sep. 20, 2012

(30) Foreign Application Priority Data

Dec. 2, 2009 (FR) ...................... 09 58585

(51) Int. Cl.
*B64C 29/00*     (2006.01)
*B64C 3/14*      (2006.01)
*B64C 39/06*     (2006.01)

(52) U.S. Cl.
CPC .............. *B64C 3/14* (2013.01); *B64C 39/064* (2013.01)

(58) Field of Classification Search
CPC .................................................... B64C 39/024
USPC ...................... 244/21, 23 R, 23 C, 12.1, 12.2
See application file for complete search history.

(56) References Cited

U.S. PATENT DOCUMENTS

| | | | |
|---|---|---|---|
| 2,054,610 A | | 9/1936 | Volpicelli |
| 3,276,723 A | * | 10/1966 | Miller et al. ............. 244/12.2 |
| 3,489,374 A | * | 1/1970 | Morcom .................. 244/12.2 |
| 3,612,445 A | * | 10/1971 | Phillips .................... 244/12.2 |
| 3,785,592 A | * | 1/1974 | Kerruish .................. 244/12.2 |
| 3,837,600 A | | 9/1974 | Mason |
| 4,796,836 A | * | 1/1989 | Buchelt ................... 244/23 R |
| 5,155,992 A | * | 10/1992 | Follensbee et al. ...... 60/200.1 |
| 5,170,963 A | * | 12/1992 | Beck, Jr. .................. 244/12.2 |
| 5,419,513 A | * | 5/1995 | Flemming et al. ...... 244/12.2 |
| 6,572,053 B2 | * | 6/2003 | Salas ........................ 244/12.2 |
| 6,575,401 B1 | * | 6/2003 | Carver ..................... 244/12.2 |
| 6,575,402 B1 | * | 6/2003 | Scott ........................ 244/12.2 |
| 6,698,685 B2 | * | 3/2004 | Walmsley ................ 244/23 C |
| 6,969,027 B2 | * | 11/2005 | Ishiba ...................... 244/23 C |
| 7,044,422 B2 | * | 5/2006 | Bostan ....................... 244/7 B |

FOREIGN PATENT DOCUMENTS

| | | |
|---|---|---|
| FR | 959 441 A | 3/1950 |
| GB | 951 186 A | 3/1964 |
| GB | 2 321 227 A | 7/1998 |

OTHER PUBLICATIONS

International Search Report for PCT/FR2010/052564, mailed May 10, 2011 (in English and French) (6 pages).
Preliminary Search Report for FR 0958585, dated Jul. 10, 2010 (2 pages).

* cited by examiner

*Primary Examiner* — Brian M O'Hara
*Assistant Examiner* — Keith L Dixon
(74) *Attorney, Agent, or Firm* — Patterson Thuente Pedersen, P.A.

(57) ABSTRACT

The invention relates to a device suitable for vertical and horizontal transport of loads, in particular heavy loads, in good weather conditions, using the load-bearing capacity obtained by means of blowing a stream of air, produced by a generator, on two longitudinal lifting wings, substantially rectilinear, arranged symmetrically on either side of a supporting structure, to which the wings are connected.

5 Claims, 12 Drawing Sheets

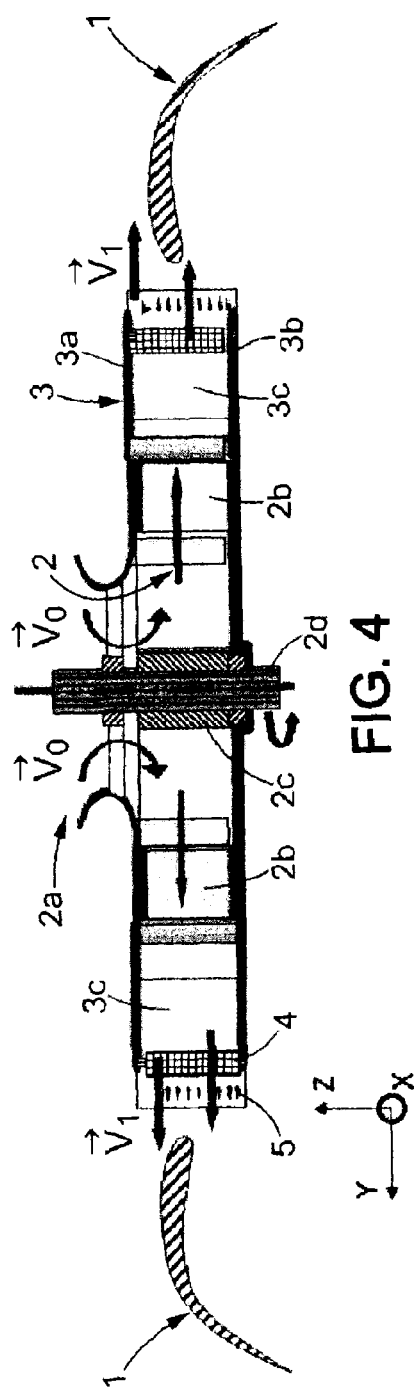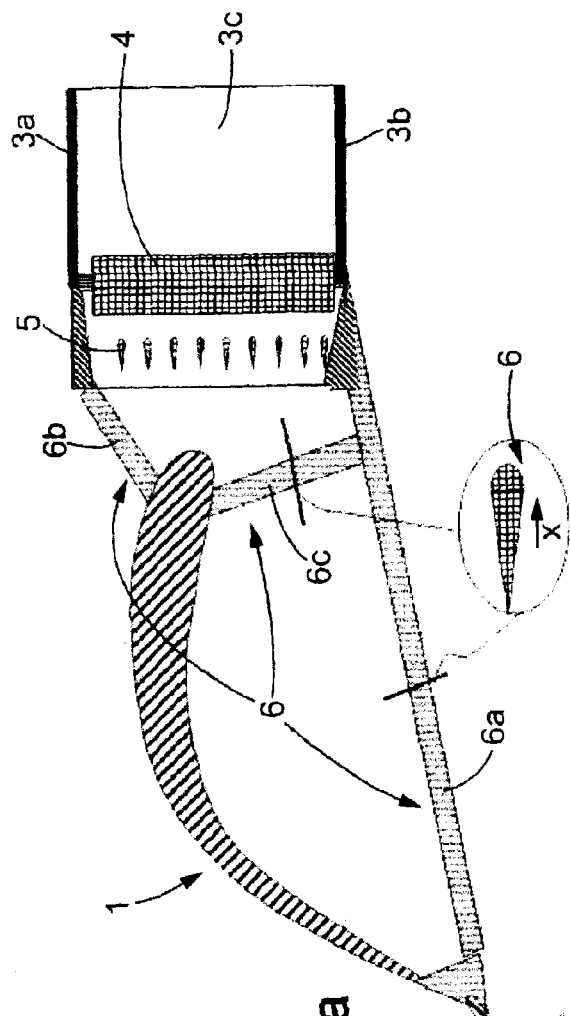
FIG. 4
FIG. 4a

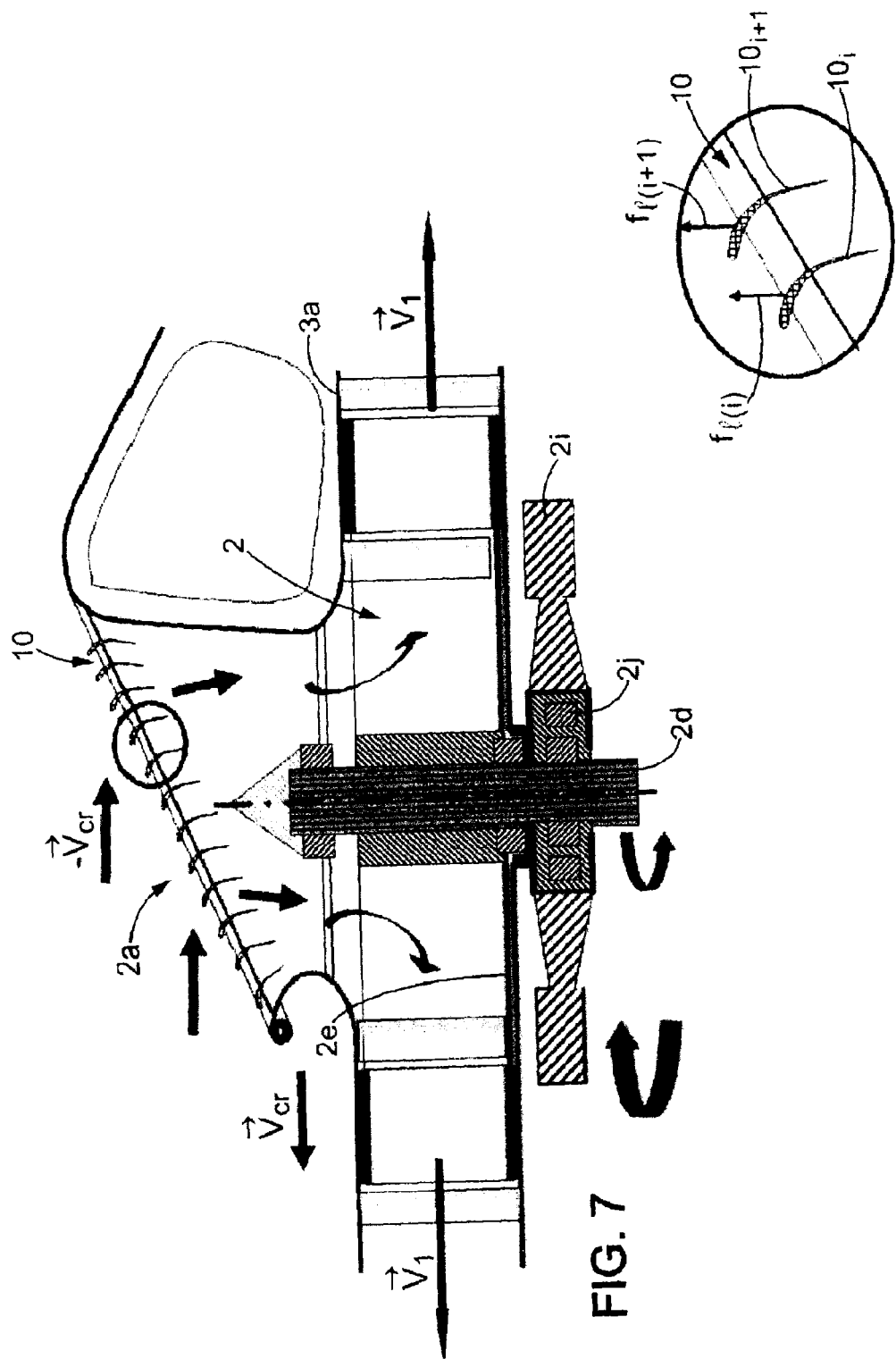

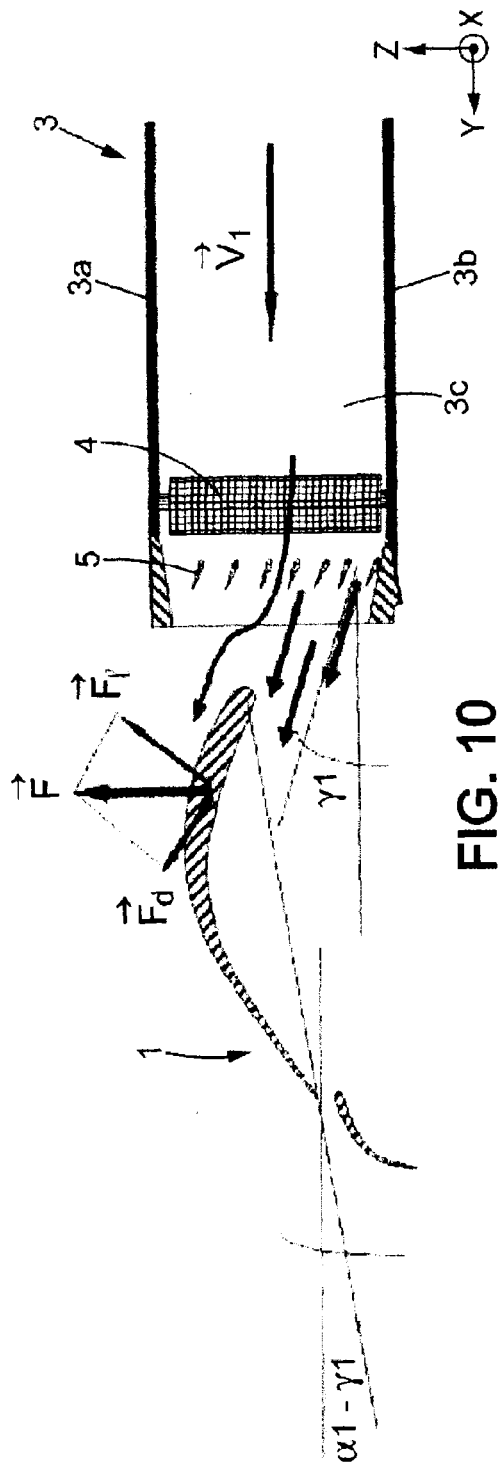
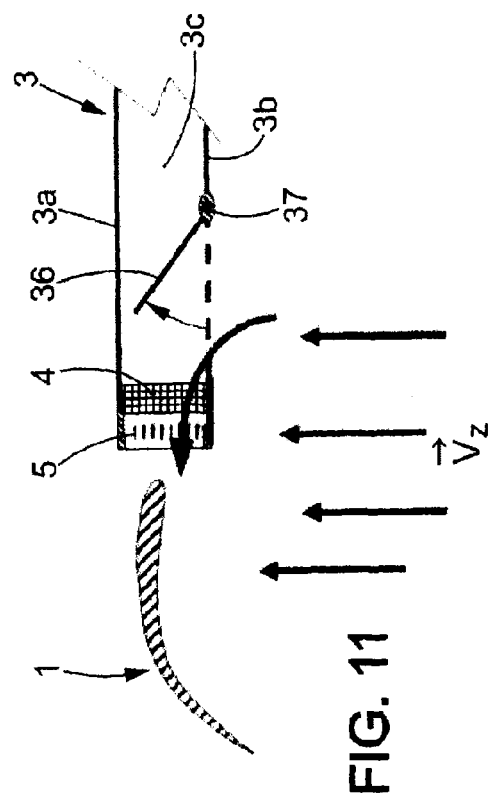
FIG. 10
FIG. 11

LIFT AND PROPULSION DEVICE, AND HEAVIER-THAN-AIR AIRCRAFT PROVIDED WITH SUCH A DEVICE

PRIORITY CLAIM

The present application is a National Phase entry of PCT Application No. PCT/FR2010/052564, filed Nov. 29, 2010, which claims priority from French Application Number 0958585, filed Dec. 2, 2009, the disclosures of which are hereby incorporated by reference herein in their entirety.

FIELD OF THE INVENTION

The present invention relates to lift/propulsion device, and in particular a heavier-than-air aircraft equipped with such a device, enabling the heavier-than-air aircraft to take off and land vertically or over short distances (vertical/short take-off and landing (V/STOL)) and in flight to be able to move in all directions.

BACKGROUND OF THE INVENTION

The invention applies to means for transporting loads. The device is advantageously designed to lift vertically and to transport horizontally, principally in competition with the lifting means of "lighter-than-air" aircraft such as dirigible balloons.

Very numerous V/STOL aircraft proposals have already been put forward. However, apart from helicopters, tilt rotor aircraft and a few military aircraft using jet deflection, such as the "Harrier", or additional lift units for take-off and landing, these proposals have not encountered the expected success. There has also been, over the past few years, a renewal of interest in craft with ducted-fans integrated into the structure of said craft.

The lack of commercial success of these aircrafts stems from the fact that they all suffer from major drawbacks, which include:
1. their low lifting capacity, which generally constrains them to use motive powers greater than would be necessary for cruising flight: this applies to helicopters, military aircraft, ducted-fan aerodynes;
2. their high price, which is a result of the aforementioned drawback, and which leads to the use of costly gas turbines to save weight in the drive system: this is the case of helicopters and ducted-fan aerodynes;
3. the danger of proximity to a rotating unprotected fan: this is the case with helicopters and tilt-rotor aerodynes, and
4. the difficulty of managing the transition phase between vertical flight and horizontal flight: this is the case of tilt-rotor and/or ducted-fan aerodynes.

To increase the vertical lift force of the lift/propulsion devices equipping V/STOL aerodynes, there have already been proposed, with some efficacy, airfoil "blowing" means. In these proposals, some or all of a flow of gas generated by a gas generator such as a gas turbine, for example, is "blown" over wings to generate a high vertical lift force under these conditions. This is the case in particular of the proposals set out in the following patent documents.

U.S. Pat. No. 4,447,028, in which direct blowing by turbojets of an aerodyne onto the extrados of the high-camber wings of the aerodyne enables the take-off distance to be shortened, but does not allow vertical take-off or landing.

U.S. Pat. Nos. 3,124,323, 3,276,723, 3,785,592, 5,054,713, 5,170,963 and 6,382,560 (among numerous further examples) all describe devices with a circular structure, like "flying saucers", in which one or more gas generators integrated into the structure blow a stream of air over peripheral airfoils, which are annular or disposed in a circle around the center of the structure. Some of these devices may be effective in developing a high vertical lift force but on the other hand all these devices have major disadvantages in horizontal flight, notably in respect of stability, resistance to forward movement (a high drag force is developed), the complexity of the mechanisms associated with the necessary mobility of the airfoils or at least parts of the airfoils, to go from one to the other of the various flight configurations, including most of all the transition between vertical flight and horizontal flight, and vice-versa. Like most of the other aforementioned patents in the same group, the aforementioned U.S. Pat. No. 5,170,963 describes a circular structure including airfoils with flaps disposed all around the circular support structure (see FIG. 1), these flaps being mobile and articulated by actuators so as to be able to move from a normal lift position (see FIG. 2A) to a high lift position (in a so-called "hyperlift" configuration, see FIG. 2B). It is clear, on examining the above patent, that to obtain a sufficient lift force the blown wings must be in a "hyperlift" configuration that will probably be satisfactory and sufficient for lifting the craft. However, knowing that in horizontal cruising flight these wings must return to a normal aerodynamic profile, and that their flaps must therefore be "retracted", it is easy to anticipate difficult or even insurmountable problems in achieving an acceptable compromise between the lift necessary for the aerodyne to continue to fly and the drag of the profiles of the airfoils that brakes the aerodyne, without taking into consideration the drag of the actuators, such as rams, that maneuver the flaps, when the airfoil profiles are subjected to a crosswise airflow.

These are probably the reasons why the inventions described in the above patent documents have never led to concrete implementations observable in everyday life.

U.S. Pat. No. 5,503,351 describes a combination of circular devices such as those referred to above with a helicopter structure (see its FIG. 1) or an autogyro structure (see its FIG. 7). The weight of the device, and above all its complexity and the drag forces generated in cruising flight render this concept difficult to apply. The transition between vertical flight and horizontal fight would also be very difficult to manage.

U.S. Pat. No. 3,837,600 describes an airplane capable of flying in any direction with the aid of fans each driven in rotation in a respective duct to which are fastened respective lift airfoils, each of the blown ducted airfoil assemblies being pivoted, at the front, in the middle and at the rear of the aircraft and laterally on either side of the cell of the aircraft, about a fixed axis inclined from top to bottom and from the outside toward the inside in a plane parallel to the plane defined by the pitch and yaw axes, with synchronized control of pivoting of the assemblies mounted at the front and in the middle of the aircraft. This proposal has the major drawback of the very high drag induced by the pivoting assemblies and the production cost and complexity and weight of the mechanisms for synchronized pivoting of said assemblies.

GB 951,186 and GB 2,321,227 disclose lift and propulsion devices for a VTOL or V/STOL aerodyne employing the lift effect obtained by blowing a stream of air produced by an airflow generator over lift airfoils connected to a lifting structure of the aerodyne, the device comprising two longitudinal, substantially rectilinear airfoils disposed on either side of the support structure and extending substantially parallel to the roll axis of the device, the two longitudinal airfoils being symmetrical to each other with respect to the plane defined by the roll and yaw axes. In this way the force of resistance to forward movement (aerodynamic drag) of these longitudinal airfoils is minimized when the device moves horizontally in the direction of its roll axis, which is its main axis.

Nevertheless, the ability to generate sufficient lift by means of such lifting devices is doubtful, for which reason, in the aforementioned patent documents, other more conventional lift and propulsion devices are provided, and are substituted for or combined with them.

SUMMARY OF THE INVENTION

An object of the invention is to alleviate all these drawbacks and to propose a device that offers a high carrying capacity at equivalent driving power compared to ducted-fan aerodynes, the capacity to generate a significant lift by maximizing the blown airflow relative to the size and the mass of the support structure, and a low penalty in respect of drag in translation flight (aircraft flight) mode, given the layout of the device of the invention.

To this end, the proposed device uses airfoils, preferably but not necessarily high-lift (hyperlift) airfoils, subjected to at least one stream of air generated by at least one large-diameter blower, and therefore to have blown wings, and arranged so that said airfoils offer a very low resistance to forward movement when the aerodyne is in horizontal cruising flight. Furthermore, this layout specific to the present invention enables a natural transition between vertical flight and horizontal flight.

To this end, the lift and propulsion device of the invention, of the general type disclosed in GB 951,186 and GB 2,321,227 and as described above, is characterized in that the airflow generator comprises at least one blower the axis whereof is vertical or at a maximum angle of approximately 30° to the yaw axis, mounted in the support structure, with a maximum diameter that corresponds to the extreme rotation diameter of the blower blades, more than 50% of the width of the support structure.

The device of the invention advantageously also has at least one of the following features.

The support structure may have, in the direction of forward cruising flight, which is the direction of the roll axis, a length greater than its width, in the direction of the pitch axis of the device, and the length of the support structure is preferably greater than twice its width.

The generatrices of the lifting surfaces of the longitudinal airfoils are substantially rectilinear and substantially parallel to the roll axis of the device or slightly inclined to that axis, which is very different from a standard aerodyne airfoil, which extends perpendicularly to the direction of movement of the aerodyne or obliquely, and therefore has a resistance to forward movement not very compatible with cruising flight, and generally necessitating complex means, notably actuators, to retract these airfoils or, more generally, to modify the aerodynamic configuration thereof, for cruising flight, which moreover imposes limitations on the architecture of said airfoils. In the proposal of the invention, the fact of having the airfoils substantially parallel to the roll axis, and thus to the speed of forward movement of the machine, outside the landing and take-off phases, has the consequence that the longitudinal airfoils of the invention offer minimum resistance since they are attacked edge-on by the relative airflow in cruising flight. It is therefore not necessary to retract these longitudinal airfoils, and thus to have complex and heavy mechanisms for effecting this operation, and the airfoil itself, which does not have to be retracted, may also be designed more efficiently.

To this end, the longitudinal airfoils are advantageously of hyperlift type and each includes at least one airfoil element having a profile with a camber greater than 5% of the chord of said profile.

Also, the most extreme generatrices of the leading edge and the trailing edge of the longitudinal airfoils may form, with the roll axis of the device, an angle less than 5°, and the generatrix of the trailing edge converges toward that of the leading edge forward of the roll axis.

The longitudinal airfoils may be connected to the support structure in such a way that they may assume any angle from −10° to +10° relative to a plane defined by two of the roll axis, pitch axis and yaw axis of the device.

Also, the elements of the longitudinal airfoils may be connected to each other and to the support structure by structural elements having in section an aerodynamic profile, such as a wing profile, and preferably arranged so that the median planes of symmetry of these profiles are parallel to the roll axis of the device, which results in a low resistance to forward movement.

To orient the stream of air blown over the airfoils at will, as a function of the requirements of the flight conditions, the airflow for blowing the airfoils is oriented, at the outlet from the support structure, in a direction toward the front or the rear of the device, and/or in a direction toward the top or the bottom of the device, by two grille systems with controlled fins or blades.

Furthermore, the airflow for blowing the airfoils may be directed upward, where it exits the support structure, at an angle preferably greater than 10° relative to the horizontal, in such a way that the resultant of the lift force and the drag force exerted on said longitudinal airfoil is substantially vertical.

For the most part, the airflow for blowing the airfoils generated by the blower or blowers exits on the longitudinal sides of the support structure via lateral airflow outlet vents that are advantageously divided into at least three and preferably four categories and controlled independently: vents facing the airfoil to provide the lift of the device, vents facing the extremities of the airfoil to assure stability about the roll axis and the pitch axis, vents that do not face anything, for stability in rotation about the yaw axis, and, where applicable, vents at the rear to provide propulsion.

To be able to orient the lift of the longitudinal airfoils at will, as a function of the requirements of the flight conditions, the longitudinal airfoils and at least one structural element that connects them to the support structure form a rigid assembly that may be locked with respect to an articulation axis parallel to or coinciding with the roll axis and/or an articulation axis parallel to or coinciding with the pitch axis.

The airflow generator may advantageously be fed via an aspiration opening associated with an array of blades and arranged and oriented to capture in substantially horizontal flight an incident airflow that is deflected by the array of blades and aspirated by said generator, preferably with at least one radial blower, and then blown transversely over the longitudinal airfoils, after flowing in a circuit in the support structure and said generator, and the aerodynamic characteristics whereof enable conservation of a great part of the initial enthalpy of the inflow of air, the blades of said array preferably being profiled and disposed in such a way as to generate lift complementary to that produced by said airfoils.

The airflow generator advantageously comprises at least two blowers the rotation directions of which are opposite so as to cancel out the overall gyroscopic torque of the blowers.

The blower or blowers advantageously include(s) an inertial mass or a flywheel mounted on the same axis as the corresponding blower, and close to it, and driven in synchronous rotation or contrarotation.

At least one blower may advantageously be a radial blower with blades inclined toward the rear relative to the direction of rotation of the blower.

However, it is also possible to use one or more axial blowers, and to combine at least one axial blower with at least one radial blower in a device with at least two blowers.

Furthermore, the radial blower or blowers include(s) blades each of which is able to pivot about an axis substantially parallel to the rotation axis of the corresponding blower and the orientation whereof about the pivot axis is controlled, said blower blades being associated with a fixed diffuser including vanes each of which also pivots about a pivot axis parallel to that of said blower blades, and the orientation of which about said pivot axis is also controlled in such a way as to adapt the angles of incidence of the blower blades and the diffuser vanes to the required power, and in particular to reduce virtually to zero the power consumed by a blower, by pivoting of said blades and said vanes in such a way as to close the passages between them, to conserve standby energy, in the event of a malfunction, or to place a blower on standby during a flight phase.

The airflow generated by the blower or blowers to blow the longitudinal airfoils advantageously has a speed in the range approximately 15 m/s to 100 m/s and preferably approximately 20 m/s to 70 m/s.

To brake the fall of the device, and thus of the aerodyne that is equipped with it, in the case of engine failure, the lower wall delimiting feed passages for the airflow for blowing the airfoils in the support structure advantageously includes articulated traps opening as a result of the pressure of a vertical ascending relative airflow to capture part of said relative airflow and to convert it into an airflow blowing the airfoils to develop lift limiting the rate of descent of the device and the aerodyne.

Alternatively, the device may further include at least one axial blower with its axis parallel to or coinciding with the roll axis and mounted at the front of the support structure the axial outflow of air from which is partly captured in the axial inlet of passages formed in the support structure and curved laterally so as to discharge laterally via vents for blowing the longitudinal airfoils, the part of the axial outflow of air from the axial blower or blowers not captured by the passages providing propulsion.

Finally, in an arrangement and a favorable disposition of each longitudinal airfoil relative to the facing support structure, each of the longitudinal airfoils is arranged and disposed relative to the support structure in such a way as to verify the following double condition:

$$0 \leq \frac{z0}{h} \leq 0.5 \text{ and } 0 \leq d \leq 10\, h,$$

where h is the height of the airflow blowing an airfoil and deflected upward by a certain angle, h being measured perpendicularly to the direction of the deflected flow, d is the distance between the leading edge of the airfoil and the outlet section of said airflow from the support structure, this distance being measured parallel to the deflected flow, and z0 is the altitude of the extreme point of the leading edge of the airfoil in the deflected airflow of height h.

To ensure a good compromise between, on the one hand, the necessary length limitation along the roll axis of the two longitudinal airfoils and the support structure and, on the other hand, optimization of the head losses in the lateral passages feeding airflow to the lateral airfoil blower vents, the length along the roll axis of each longitudinal airfoil is advantageously substantially equal, to within + or −20%, to $$\frac{n}{2}$$

times the circumference of a blower, n being the number of blowers, of substantially the same diameter, of the device, in particular in the case where the device comprises one or two blowers.

The invention also provides a vertical or short take-off and landing aerodyne, comprising a support structure supporting a lift and propulsion device, characterized in that said device is a device as described above and supported in an upper part of said support structure, which is fitted out, in a lower part, as a nacelle in particular accommodating a driving system and disposed between the two longitudinal lifting airfoils of said device.

The advantage of this position of the nacelle, carrying the drive system and the payload (passengers and/or freight) underneath the lift and propulsion device and between the two longitudinal airfoils of that device is that it facilitates stabilization of the aerodyne by distancing the airflow control areas from the center of mass, which achieves better stabilization than a structure lifted by axial blowers, which is always the weak point of short take-off and landing aerodynes other than helicopters.

BRIEF DESCRIPTION OF THE DRAWINGS

The invention will be better understood, and other features and advantages of the invention will emerge more clearly from a reading of the description by way of nonlimiting example of embodiments given hereinafter with reference to the appended drawings, in which:

FIG. 3b is a plan view of an aerodyne such as that from FIG. 3 equipped with the lifting device from FIG. 3a;

FIG. 4 is a view in cross section analogous to FIG. 3a of another example of a lifting device of the invention, with a radial blower;

FIG. 4a is a detailed view to a larger scale of part of FIG. 4, representing the attachments of the left-hand airfoil from FIG. 4 to the support structure;

FIG. 7 is a view in partial cross section analogous to that of FIG. 6 for a further example of a lifting device, with a centrifugal blower and suitable means for aspiration of the inflow of air into the blower, with lift recovery;

FIG. 7a is a view to a larger scale of a detail from FIG. 7;

FIG. 10 is a view in partial cross section analogous to that of FIG. 4a of a blower of a longitudinal airfoil with two elements with an airflow oriented slightly upward to optimize the lift force on that airfoil;

FIG. 11 is a view in partial cross section analogous to that of FIG. 10 of the lift/propulsion device configured for a situation of a malfunction of the motor or motors driving the blower or blowers and rapid descent of the aerodyne, with opening of a trap for recovery and circulation of the vertical relative airflow $\vec{V}$z generated on the airfoil by virtue of the descent of the aerodyne;

DETAILED DESCRIPTION OF THE DRAWINGS

Figure 3:
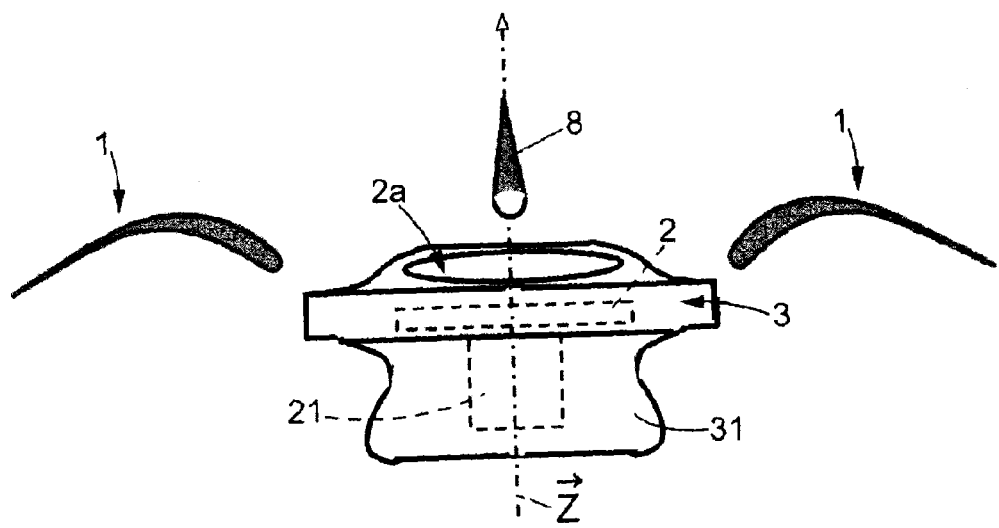
FIG. 3 is a diagrammatic view of one embodiment of the aerodyne of the invention, partly in lateral elevation at the level of the support structure and the cell of the aerodyne, and partly in cross section at the level of the longitudinal airfoils.

Throughout the following description, the same numerical or alphanumerical references are used to designate identical or analogous elements in the various embodiments represented in the Figures and, except for the part of the description referring to FIG. 3, the device described is only the device of the aerodyne that provides lift and propulsion. There are not described in detail, in particular, the drive system, the power transmission system from the drive system to the blower or blowers, or the passenger and/or freight nacelle, these elements preferably being disposed underneath the lift/propulsion device of the invention, as described with reference to FIG. 3.

In all the Figures, the axis X is the roll axis, oriented toward the front of the aerodyne, thus in the direction of movement of the aerodyne in horizontal flight, and, more generally, outside the phases of vertical take-off and landing, the axis X extending in the longitudinal direction of the aerodyne, whereas the axis Y is the pitch axis, which is transverse and perpendicular to the longitudinal axis, being generally horizontal in the stable flight configuration of the aerodyne, and the axis Z is the yaw axis, perpendicular to the plane defined by the axes X and Y, and thus normally vertical in the stable flight configuration of the aerodyne.

Figure 1:
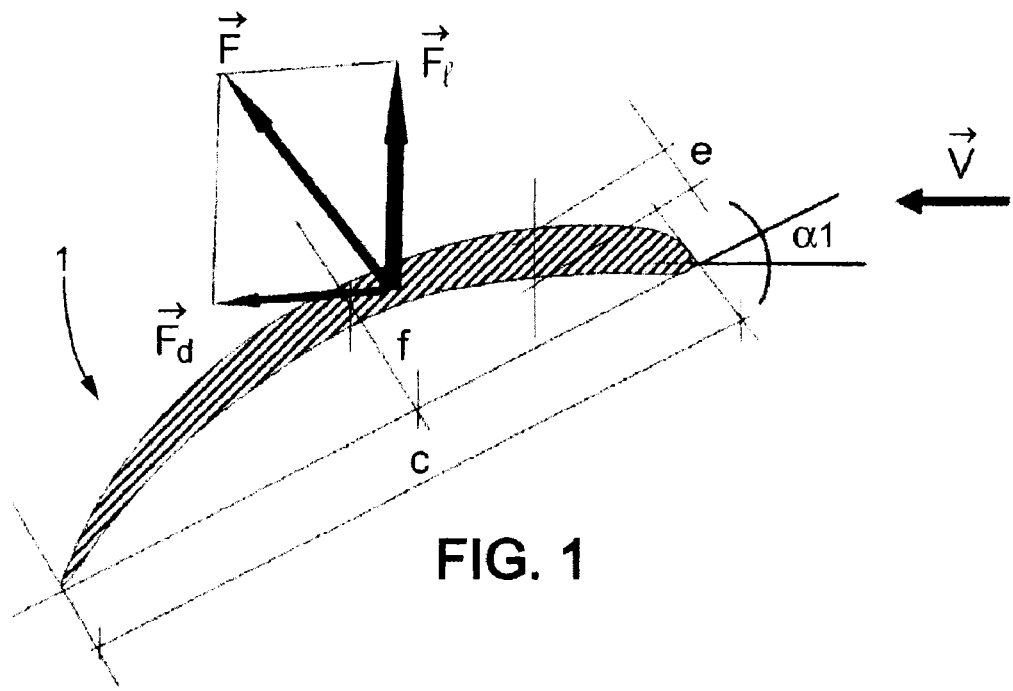
FIG. 1 is a diagrammatic view summarizing the main features of a single high-camber wing, i.e. one having a hyperlift aerodynamic profile, and the aerodynamic forces that are exerted on the wing when this wing is blown by a relative airflow $\vec{V}$.

FIG. 1 represents a wing 1 subjected to an airflow of speed V oriented in the direction of the corresponding arrow in FIG. 1, and parameters important to the implementation of the invention are the aerodynamic profile of the wing 1, the angle of incidence αl of the wing 1 relative to the direction of the relative airflow $\vec{V}$, the chord c of the wing 1, which is its neutral fiber (median fiber) going from its leading edge (the most forward point of the corresponding cross section of said profile) to its trailing edge (the rearmost point of this same cross section) of the wing 1, so that the chord c represents the distance between these two most extreme points of the profile of the wing, the "hollow" or the negative camber f of the wing 1, and the camber of the wing 1, which is the ratio $$\frac{f}{c},$$

and which is expressed as a percentage of the chord c. The resulting aerodynamic forces are exerted on the wing 1 and the resultant force at the center of thrust of the wing 1 is denoted $\vec{F}$ and given by the following formula:

$$F = \frac{1}{2} x Ro x V^2 x S,$$

where Ro is the specific mass of air, which is 1.225 kg/m³ in a standard atmosphere at 20° C., $\vec{V}$ is, as already stated, the speed of the relative airflow to which the wing 1 is subjected, and S is the surface area of the wing, i.e. the product Lxc in the case of a wing of constant chord c and length L. This resultant $\vec{F}$ of the aerodynamic forces exerted on the wing 1 breaks down into a lift force $\vec{F}$l=$\vec{F}$×Kl, where Kl is a lift coefficient specific to the wing 1, and depending on the geometrical parameters that define the wing 1, and a drag force $\vec{F}$d, such that $\vec{F}$d=$\vec{F}$×Kd where Kd is a drag coefficient, also specific to the wing 1, and depending on the geometry of its profile.

It is known that the camber $$\frac{f}{c}$$

of a wing and the angle of incidence αl relative to the relative airflow $\vec{V}$ may be increased within certain limits to increase very considerably the value of the lift coefficient Kl. Thus a so-called hyperlift profile may be created, the disadvantage of which is that it also has an increased drag coefficient Kd. Now, such an increase in the drag coefficient Kd is incompatible with the cruising flight of an aerodyne, the drive system and the fuel consumption then being excessive.

Figure 1A:
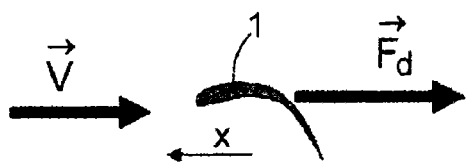
FIGS. 1a and 1b represent diagrammatically a hyperlift profile and the drag force $\vec{F}d$ that it generates according to whether it is subjected to a so-called frontal relative airflow $\vec{V}$ (perpendicular to the longitudinal generatrices defining the aerodynamic profile) or lateral relative airflow, respectively.
Figure 1B:
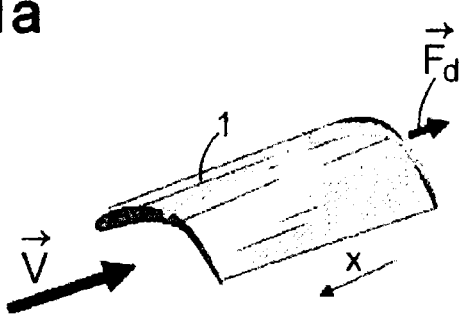

The wing 1 represented diagrammatically in FIG. 1 is a high-camber $$\left(\frac{f}{c} > 5\%\right)$$

wing of the hyperlift type, i.e. which has a lift coefficient Kl>1 for an angle of incidence α1>10°. FIGS. 1a and 1b represent diagrammatically this hyperlift profile and the drag force $\vec{F}d$ depending on whether this profile is subjected to a relative airflow $\vec{V}$ of "frontal" orientation (in the plane of the aerodynamic profile of the wing 1) or "lateral" orientation (longitudinal, along the span of the wing 1), and these two FIGS. 1a and 1b show that a high-lift airfoil oriented transversely to the airflow $\vec{V}$ exerts a drag force $\vec{F}d$ very much greater, by a very high factor (greater than 10), than the drag force $\vec{F}d$ on the same airfoil subjected to the same airflow $\vec{V}$ but longitudinally, parallel to the length of the wing 1, as in FIG. 1b.

Figure 2:
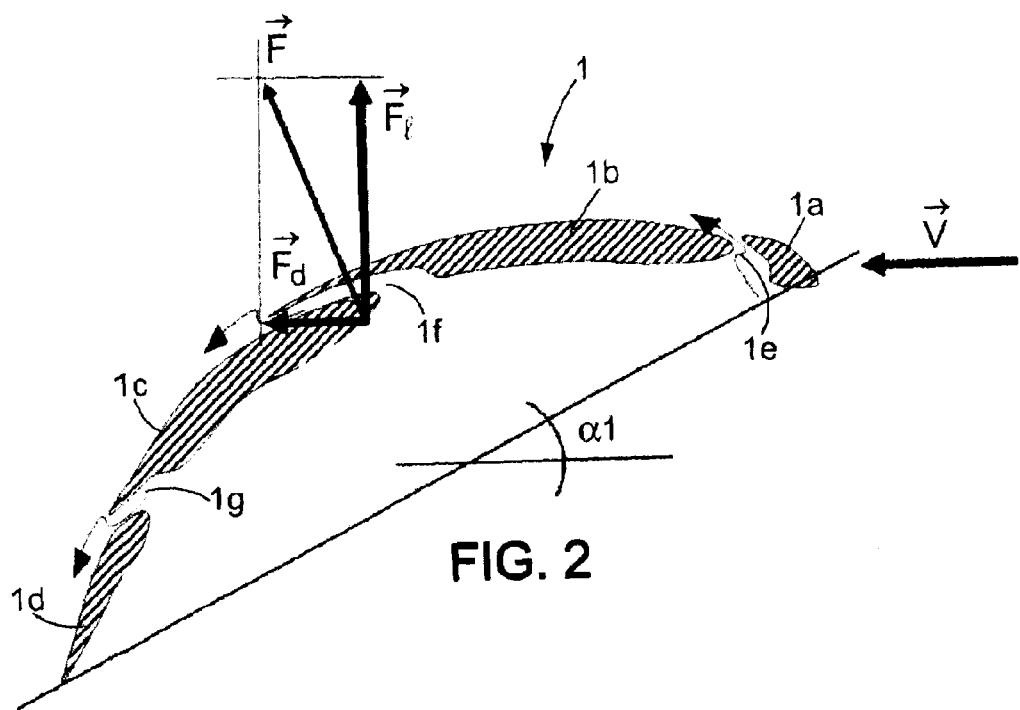
FIG. 2 is a sectional view analogous to FIG. 1 of an example of a hyperlift airfoil comprising a plurality of elements, four elements in this example.

FIG. 2 represents an example of a hyperlift airfoil 1 with an arrangement of four airfoil elements 1a to 1d in succession from the leading edge to the trailing edge of the airfoil 1, and where some airfoil elements have a high camber, a high angle of incidence relative to the relative airflow $\vec{V}$, air circulation slots 1e, 1f, 1g separating two adjacent airfoil elements to limit the phenomena of boundary layer separation on the extrados of the airfoil 1, which is at reduced pressure, by taking air from the intrados of the airfoil 1, which is at raised pressure. Accordingly, the airfoil 1 in FIG. 2 includes a first airfoil element 1a, or leading edge nose, separated by a slot 1e from a second airfoil element 1b, which is a wing of fairly standard profile, with a small camber (for example 4%), and an angle of incidence relative to the airflow $\vec{V}$ limited to 9° to prevent the risk of boundary layer separation. This second airfoil element 1b is followed by a third airfoil element 1c, from which it is separated by a slot 1f, and which is a wing of significantly greater camber (15% to 25%), this third airfoil element 1c being itself followed by the fourth airfoil element 1d, in the form of a trailing edge wing of small camber and chord but high angle of incidence, from which the third airfoil element 1c is separated by a slot 1g. The mean angle of incidence α1 of the airfoil is preferably greater than 20°. There is obtained in this way an airfoil 1 of very high efficiency from the lift point of view and that is also very robust from the lift evolution point of view when the aerodyne is in motion, as explained hereinafter.

FIG. 3 represents diagrammatically an example of an aerodyne of the invention comprising a support structure 3 supporting in the upper part a lift and propulsion device and arranged in the lower part as a nacelle 31. The lift and propulsion device essentially includes an airflow generator 2 and two lift airfoils 1 disposed on either side of the structure 3 and connected, in a manner that is not represented in FIG. 3 but may be seen in FIGS. 4a, 5 and 9 and is described hereinafter, to the support structure 3, and each blown laterally by an outflow of air from the generator 2, which is fed with ambient air by at least one air inlet or aspiration opening 2a formed in the upper part of the structure 3. The airfoils 1 have aerodynamic profiles and lifting surfaces defined by substantially rectilinear generatrices extending substantially in the longitudinal direction of the aerodyne, and thus of its support structure 3, i.e. substantially along the roll axis X, being disposed symmetrically with respect to the plane defined by the roll axis X and the yaw axis Z, laterally on either side of the support structure 3. Similarly, the two airfoils 1, each formed in this example of a one-piece non-retractable hyperlift wing of thickness e that may be relatively small, are blown symmetrically with respect to said plane of the roll axis X and the yaw axis Z by the outflow from the generator 2.

As a result, the two airfoils 1 develop drag forces $\vec{F}d$ of the same amplitude but in opposite directions, and which therefore cancel out, and lift forces $\vec{F}l$ that add to lift the aerodyne.

The airflow generator 2 takes the form of an air compressor constituted, for example, of at least one centrifugal or axial blower, which may be of the ducted-fan or ducted multiblade type, integrated into the support structure 3 and driven in rotation by a power transmission (not shown) from an engine 21 mounted in the nacelle 31, for example an internal combustion engine fed with fuel from a tank (not shown) also mounted in the nacelle 31, which also houses a control station, for remote control or pilot control of the aerodyne, and a cabin and/or a hold for transporting passengers and/or cargo, respectively.

It should be noted that such an aerodyne is advantageously and principally intended to move vertically and transport substantially horizontally heavy loads, preferably under favorable meteorological conditions, with little wind, under which conditions this aerodyne principally competes with "lighter-than-air" lifting means such as dirigible balloons.

To complete the description of the FIG. 3 aerodyne, the latter is also equipped with a rudder unit 8, projecting above the support structure 3 and fixed (in a manner that is not shown) to the rear part of the latter, and a portion of which pivoting about an axis parallel to the yaw axis Z may be oriented to serve as a rudder.

Figure 3A:
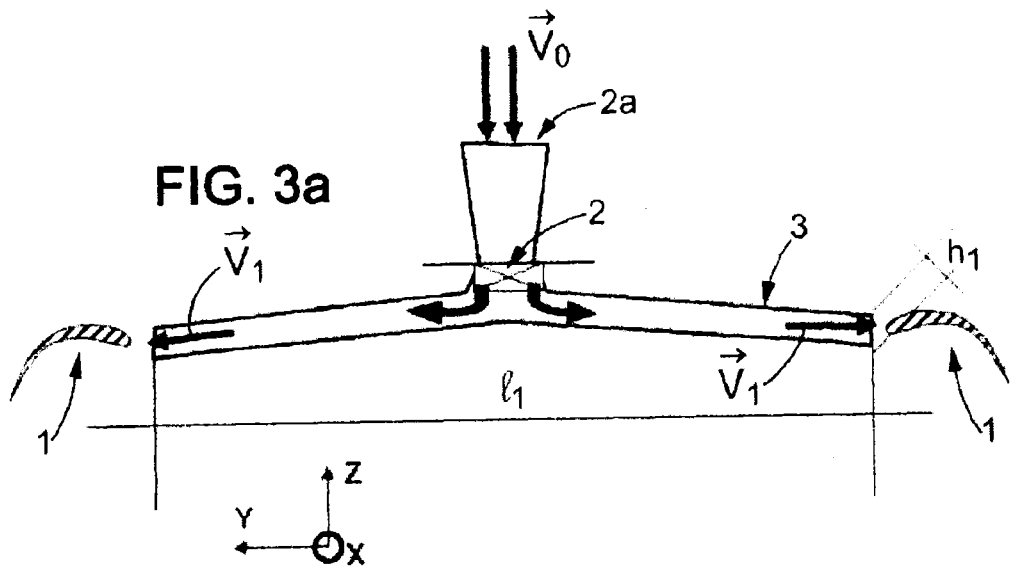
FIG. 3a is a diagrammatic view in cross section of the essential elements of the lifting device of an aerodyne such as that from FIG. 3.
Figure 3B:
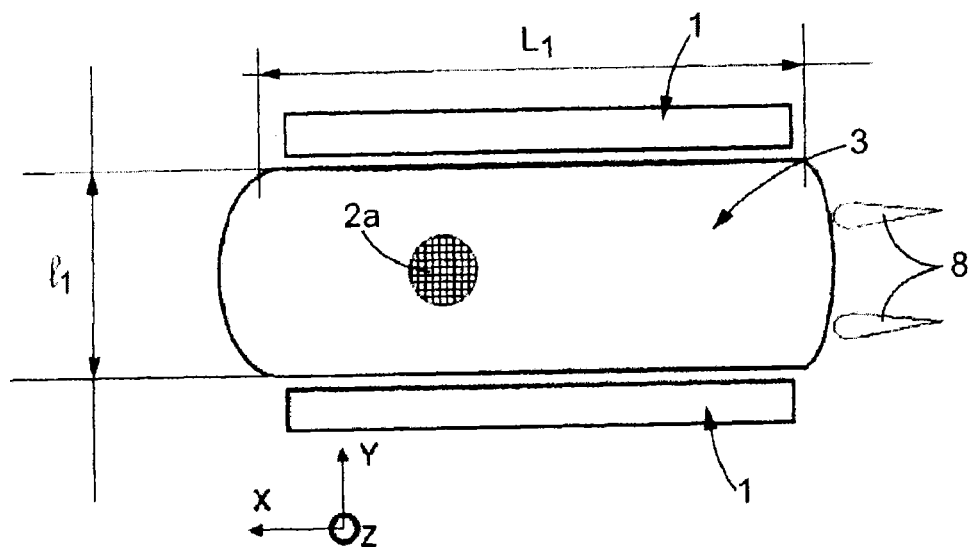

FIGS. 3a and 3b show diagrammatically, respectively in cross section and in plan view, the general structure of a lift/propulsion device of the invention, with an airflow generator 2 in the form of an axial-centrifugal compressor that aspirates air at a speed Vo via an aspiration opening 2a and that divides this accelerated flow of air into guide passages of the support structure 3. These passages guide this airflow for the most part over the two lifting airfoils 1, which are rectilinear and disposed longitudinally, substantially parallel to the roll axis X that corresponds to the direction of movement of the aerodyne in cruising flight, these airfoils 1 being symmetrically disposed on either side of the support structure 3 with respect to the plane of the roll axis X and the yaw axis Z, and preferably, although not exclusively, consisting of hyperlift airfoils. The airflows for blowing the longitudinal airfoils 1 exit in opposite directions via lateral vents of height h1 at a speed V1 close to the speed of the air leaving the blower 2, and the vents are distributed over the perimeter of the support structure 3 so that most of them, representing more than 50% of the length of the vents, are distributed over the two longitudinal sides, of length L1 (see FIG. 3b), of the support structure 3, the lateral vents, visible in FIG. 3a, being preferably also symmetrical with respect to the plane of the roll axis X and the yaw axis Z on the opposite longer sides of the support structure 3, the length L1 whereof along the roll axis X is at least twice the width l1 (see FIG. 3b), which enables this design of the aerodyne to be optimized by the choice of an architecture that maximizes the length of the lateral vents dedicated to blowing the two longitudinal airfoils 1, the substantially rectilinear shape whereof and the disposition whereof parallel to the roll axis X or longitudinal axis of the structure 3 on the one hand enables a high lift to be produced and on the other hand enables a greater lever arm to be obtained for lateral vents that serve to balance the attitude of the aerodyne, as described in more detail hereinafter. An essential advantage of the configuration proposed by the invention is that, in addition to the absence of significant drag force on the airfoils 1 moving with the support structure 3 of the aerodyne, the transition between vertical flight with a main component along the yaw axis Z and horizontal flight with a main component along the roll axis X is effected in a very natural manner since the same configuration is retained in both situations, as is explained in more detail hereinafter with reference to FIGS. 8a and 8b.

In FIGS. 3a and 3b, as in FIG. 3 described above, the attachments of the two longitudinal airfoils 1 to the support structure 3 are not represented and the rear edge of the support structure 3, which is slightly convex toward the rear, is equipped with two vertical rudder assemblies 8 that are parallel and at least in part orientable about an axis parallel to the yaw axis Z to stabilize the aerodyne in forward flight and to serve as rudders. It is also seen that each of the longitudinal airfoils 1 extends over substantially all of the length of the corresponding longer side of the structure 3.

A different embodiment of the lift and propulsion device is represented in cross section in FIG. 4 at the level of a centrifugal radial blower 2 centered on the roll axis X and constituting the airflow generator and in FIG. 4a, representing this device in partial cross section at the level of an attachment of one of the two longitudinal airfoils 1 to the corresponding lateral edge of the support structure 3.

The use as the airflow generator of a multiblade rotor radial blower including blades 2b inclined toward the rear (relative to the direction of rotation of the rotor) is the preferred embodiment in the case of a single blower and at least for the forward blower in the case of a plurality of blowers constituting the airflow generator distributed over the length of the support structure 3. A radial blower of this kind has the advantage of being very advantageously integrated into the support structure 3, with a good compromise from the efficiency and flow rate points of view. In FIG. 4, air aspirated via an inlet opening 2a with an appropriate volute profile is accelerated on passing between the blades 2b of the rotor of the blower 2, the hub 2c whereof is driven in rotation by a rotor shaft 2d. This accelerated air is then conveyed in passages 3c of the support structure 3 that are delimited between an upper wall 3a and a lower wall 3b of this support structure 3. The airflow leaving the blower 2 is then for the most part discharged on the two opposite longer sides of this structure 3 via rectangular lateral vents of constant height h1 and formed by two grilles 4 and 5, constituted of aerodynamically profiled and articulated blades controlled as a function of the flight configuration to orient the flow of air through these grilles 4 and 5 locally upward or downward, as required, in the case of the blades 5 and/or toward the front or the rear of the aerodyne (relative to its roll axis X) in the case of the blades 4 situated upstream of the blades 5. The airflows in opposite directions leaving laterally on the two longer sides of the support structure 3 are thus each blown onto a respective one of the two longitudinal airfoils 1, each of which is attached to the support structure 3 by struts 6 represented in FIG. 4a and distributed along each corresponding longer side. These struts 6, one particular feature of which is to have an aerodynamic profile in the direction of the roll axis X, represented in section in the FIG. 4a detail, comprise a lower lateral arm 6a connecting the trailing edge of a corresponding airfoil 1 to the lateral edge of the lower wall 3b of the structure 3, an upper lateral arm 6b connecting the extrados of the leading edge of this airfoil 1 to the lateral edge of the upper wall 3a of the structure 3, in vertical alignment with the corresponding lower arm 6a and its attachment to the lower wall 3b, as well as a stay 6c stiffening the connection by attaching the intrados of the leading edge of this airfoil 1 to the lower lateral arm 6a, in the vicinity of its attachment to the lower wall 3b.

Other arrangements of struts and arms for attaching the airfoils 1 to the support structure 3 are possible, of course, but that proposed in FIG. 4a achieves good stiffness at the same time as having a simple, light and economic structure.

Figure 5:
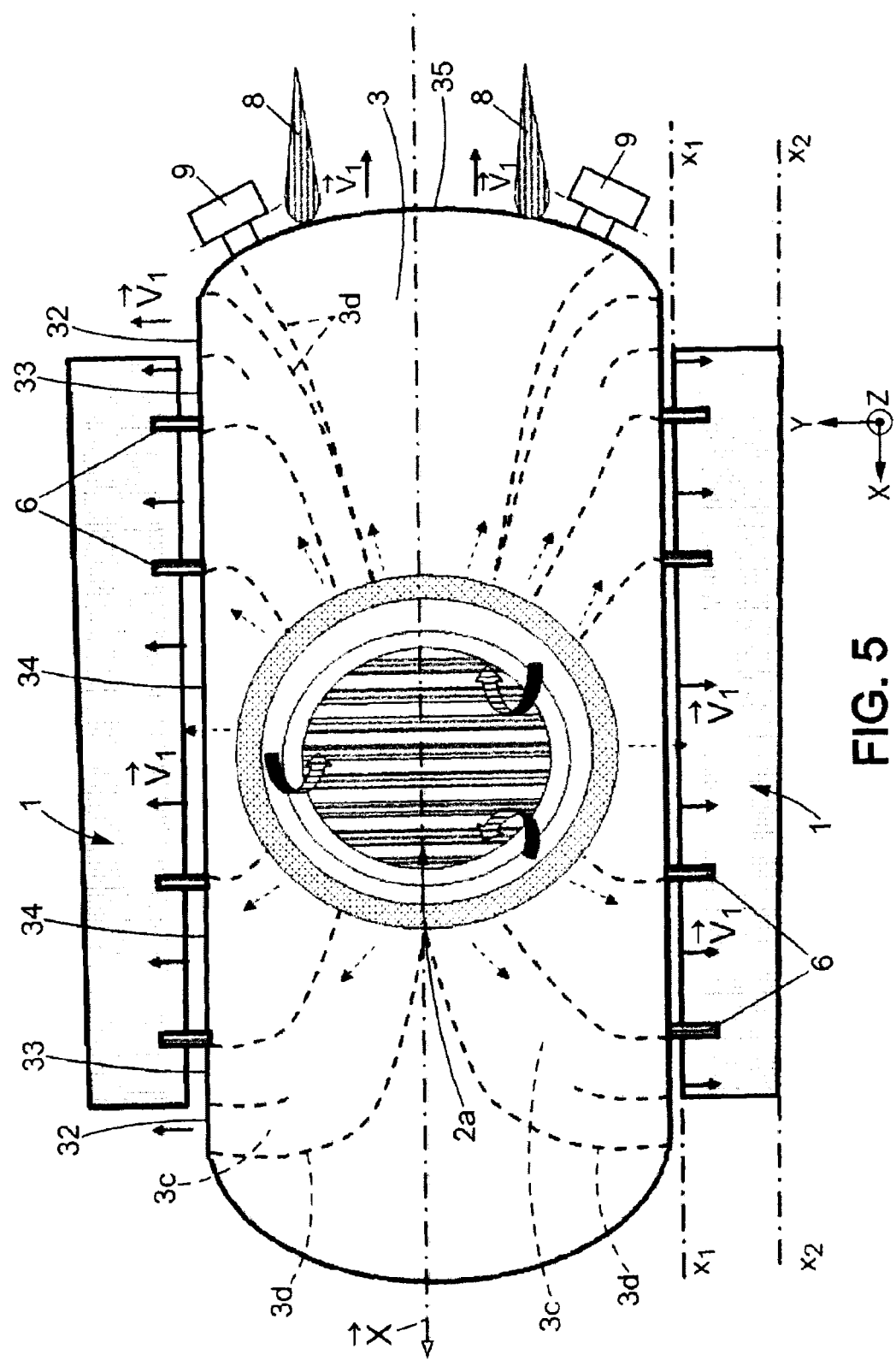
FIG. 5 is a plan view of one example of an aerodyne equipped with the device from FIGS. 4 and 4a, and representing the circulation of the airflow generated by the radial blower of the lifting device.

FIG. 5 is a general plan view of the device of the invention from FIGS. 4 and 4a in which the two airfoils 1 are disposed longitudinally, on either side of the support structure 3, substantially parallel to the roll axis X, these airfoils 1 being mounted symmetrically with respect to the plane of the roll axis X and the yaw axis Z and being connected to the lower sides of the structure 3 by struts 6 spaced along the roll axis X, which is the axis of movement of the aerodyne in cruising flight. The generatrices of the lifting surfaces of the longitudinal airfoils 1 are substantially rectilinear and substantially parallel to the roll axis X, which is the longitudinal median or central axis of the device, and possibly also of the aerodyne. These generatrices may also advantageously be very slightly conical, with the tip of the cone directed toward the front of the device (toward the left in FIG. 5), so that, seen in plan view, each of the two airfoils 1 has the shape of a right-angle trapezium the two bases whereof extend along the pitch axis Y, the shorter base being at the front, and are very much less than the height of the right-angle trapezium that extends along the roll axis X over practically all of the length of the corresponding longer side of the structure 3, and so that the relative airflow incident on the airfoils 1 when the aerodyne is in substantially horizontal cruising flight along the roll axis X, is directed over the extrados of the airfoils 1, having the effect of deflecting the slipstream toward the airfoil 1, preventing their separation. The generatrices x1 x1 and x2 x2 at the level of the leading edge and the trailing edge of each of the blown lateral airfoils 1, respectively, show this conical feature, on the lower airfoil 1 in FIG. 5, with the angle of inclination of the generatrix x2 x2 of the trailing edge to the generatrix x1 x1 of the leading edge exaggerated for clarity, this angle being less than or equal to 5°.

Each airfoil 1 may advantageously also be mounted in a lateral cradle connected to the support structure 3 with limited mobility in pivoting about the pitch axis Y or an axis parallel thereto, as described hereinafter with reference to FIG. 10, so that all of the airfoil 1 may be turned slightly about the pitch axis Y through an angle less than ±10° to adapt the angle of incidence of the airfoil 1 to particular flight conditions.

In the FIG. 5 device, as already described with reference to FIG. 4, air is aspirated via the opening 2a produced in the upper part of the support structure 3, accelerated by the radial blower 2 and finally, via passages 3c delimited by partitions 3d (between the upper wall 3a and the lower wall 3b in FIGS. 4 and 4a) of the support structure 3, directed to the periphery of the structure 3 and at different locations from the front to the rear of the aerodyne. The section of the passages 3c is advantageously convergent, i.e. the individual section of a sector of outlet vents of the airflow toward the exterior of the structure 3, and in particular toward the airfoils 1, is advantageously slightly smaller (by a few percent) than the outlet section of the blower 2 from which the corresponding passage 3c extends. The outlet vents for the airflow are thus distributed all around the support structure 3, in the following manner:

- vents 32 referred to herein as "not facing anything", because they have no facing longitudinal airfoil portion 1, and therefore discharge laterally of the structure 3 beyond the front and rear ends (along the roll axis X) of each of the two airfoils 1, used to stabilize the aerodyne, in particular in rotation about the yaw axis Z;
- vents 33 adjacent the vents 32 and thus facing a longitudinal airfoil end portion 1, used to stabilize the aerodyne, but in rotation about the roll axis X and/or the pitch axis Y;
- vents 34 between the vents 33 on each longer side of the structure 3, and thus facing the greater part of the airfoils 1, and the function of which is to provide most of the lift; and
- vents 35, discharging to the rear of the structure 3, that serve to deliver a propulsive thrust to the aerodyne in cruising flight, and to top up the lift in a phase of (vertical) ascent or descent of the aerodyne, by directing at least part of the airflow leaving these vents 35 downward, for example by means of hyperlift flaps 9 mounted to pivot about transverse axes in a plane parallel to the roll axis X and the pitch axis Y, and which may be parallel to the axis Y, and adapted to be oriented by actuators about these axes not only to be able to assist with take-off but also to be used as elevons, to exercise the function of classic ailerons, when the aerodyne turns, and so that these control surfaces 9 can also be used, in combination with the rudder unit 8, to stabilize the aerodyne and to steer it in flight, by acting as elevators.

The vents 33 and 34 for blowing the airfoils 1 represent more than 50% of the total length of the vents on the perimeter of the support structure 3.

The rudder unit or units 8 may also be used in stationary flight to combat the gyroscopic torque of the engine in the case of an airflow generator constituted of a single blower, by producing moments that add to those generated by the "free" vents 32 of the device. Just before leaving via the vents, the airflow may be oriented toward the front or the rear of the aerodyne, and/or toward the top or the bottom of the structure 3, by two systems of grilles with fins or blades, like the grilles 4 and 5 in FIGS. 4 and 4a; these grilles are divided into sectors and each grille sector corresponds at least to a respective category of vents identified above. The grilles of these sectors are driven by individual actuators so that they may be controlled independently of each other to obtain the required effects on the behavior of the aerodyne. Moreover, upstream of these slatted grilles 4 and 5, some of the airflow feed passages 3c may include valves (not shown), for example butterfly valves, so as to be able to interrupt or at least to modulate the supply of air to a particular sector of the periphery of the supporting surface 3 and redistribute the supply of air to other sectors.

Moreover, if necessary, the aerodyne may also include propulsion means separate from the rear vents 35, for example a propulsion propeller.

Figure 6:
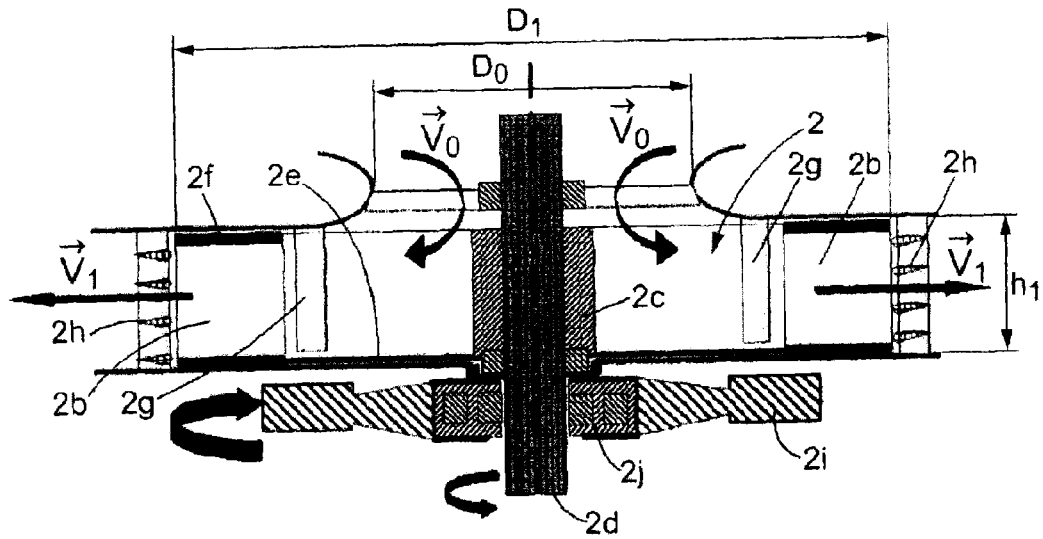
FIG. 6 is a view in partial cross section of another example of a lifting device with a centrifugal blower and control means suitable for the lifting device and the aerodyne of the invention.

FIG. 6 represents in partial cross section another variant of the lifting device for which a centrifugal blower is very suitable.

Generally speaking, the airflow may be generated from axial or centrifugal (radial) blowers or from contrarotating ducted-fans, to eliminate the gyroscopic torque.

In the FIG. 6 variant, the airflow generator 2 is a centrifugal blower with rearwardly inclined blades 2b because, as already mentioned above with reference to FIG. 4, a centrifugal blower of this kind is very suitable for generating lift by blowing the lateral airfoils 1 according to the invention. Additionally, however, to adapt this blower 2 to its use in the context of the invention, this blower 2 advantageously has the following specific features:

- a plate 2e driven in rotation by the drive shaft 2d and that entrains with it a set of propulsion blades 2b on the plate 2e braced by an upper ring 2f;
- fixed vanes 2g of an annular stator diffuser mounted immediately upstream (relative to the airflow direction) of the rotary blades 2b;
- a grille with deflector blades 2h at the outlet from the blower 2; and
- advantageously, additionally, a flywheel 2i mounted around the drive shaft 2d under the plate 2e and driven in rotation by the shaft 2d via a gearbox 2j.

Figure 6A:
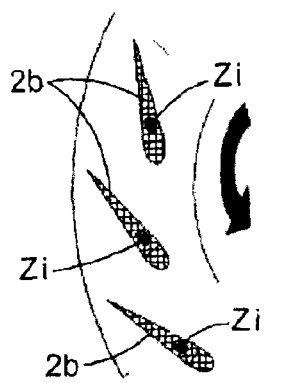
FIGS. 6a, 6b and 6c are partial plan views of blower blades and fixed vanes of a distributor associated with the blower, the blades and fixed vanes being orientable.
Figure 6B:
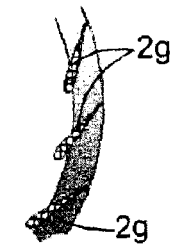
Figure 6C:
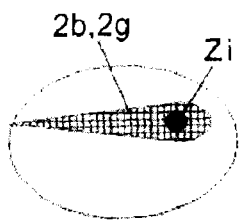

The outside diameter D1 of the plate 2e, very much greater than the diameter Do of the air inlet, is equal to at least 50% of the width (l1 in FIG. 3b) of the support structure 3, to make best use of the available space, and to generate an airflow at high flow rate and low speed. To this end, the outlet speed $\vec{V}1$ of the airflow from the single blower 2 or, if a plurality of blowers is provided, the blowers that feed the vents 33 and 34 facing the airfoils 1, is chosen to be relatively low, in the range 25 m/s to 100 m/s. The blades 2b of the blower 2 are inclined rearwardly relative to the rotation direction of the rotor of this blower 2, and these blades 2b may each pivot about an axis Zi (see FIGS. 6a and 6c) that is parallel to the yaw axis Z. The blades 2b are pivoted by actuators and likewise the vanes 2g of the diffuser placed upstream of the blower rotor 2, the vanes 2g of which are also each articulated (see FIG. 6c) about an axis Zi parallel to the yaw axis Z (the actuators are not shown in FIG. 6 for clarity and simplicity). FIGS. 6a and 6b respectively show parts of the rotor with the blades 2b of the blower 2 and the stator diffuser vanes 2g immediately upstream of that rotor.

In this way, the blower 2 is driven with a fixed rotation speed and the pre-rotation of the airflow by the vanes 2g of the diffuser, followed by the definitive acceleration of the flow by the blades 2b of the blower 2, are effected with the pivot angles of the vanes 2g of the diffuser and the blades 2b locked at appropriate predetermined values.

It is thus possible to modulate at any time the driving "load", the power delivered and, consequently, the lift force exerted by the airfoils 1.

Another advantage of this configuration is that in the event of a malfunction, for example engine failure, the blower 2 may go to a failsafe mode by closing the passages between the vanes 2g of the diffuser by appropriately controlling the inclination of these vanes 2g and also closing the passages between the blades 2b of the blower 2 by appropriately controlling the inclination of these blades. There is then a zero flow rate and no power is absorbed by the blower 2. It continues to turn, because of the effect of the kinetic energy stored in its rotor, advantageously increased by the kinetic energy of the flywheel $2i$ driven in rotation at the same time as the rotor of the blower 2.

With the engine failure configuration persisting, which leads to a loss of lift from the airfoils 1, then the closure of the passages between the vanes $2g$ and between the blades $2b$, so that the aerodyne loses altitude, the blades $2b$ and the vanes $2g$ may be reactivated, i.e. rotated to re-open the air passage between the vanes $2g$ and between the blades $2b$ when the aerodyne is sufficiently close to the ground, for example at an altitude of the order of 20 to 50 meters. The kinetic energy stored in the rotor with blades $2b$ of the blower 2 as in the flywheel $2i$ is then restored to develop a flow of air blown over the airfoils 1 and thus to develop lift, which efficaciously slows the descent of the aerodyne. It should be noted that the flywheel $2i$ is advantageously driven in rotation in the opposite direction to the rotor of the blower 2 so as to cancel out at least in part the resisting moment in rotation about the roll axis X linked to the gyroscopic torque, if necessary.

On the other hand, the peripheral speed of the blower 2 is preferably chosen to be very high, of the order of 200 m/s for example. Thus it may suffice to integrate an additional mass into the peripheral structure of the plate or rotor of the blower 2 to generate a high inertia (flywheel "integrated" into the blower rotor). The flywheel 2, for its part, being separate, has two functions: one is to increase further the stored kinetic energy and the other—in the case of a flywheel $2i$ contrarotating relative to the blower 2—is to reduce or even to eliminate the resisting moment in rotation about the roll axis X linked to the gyroscopic torque. It may be beneficial to retain a portion of this gyroscopic torque to increase flight stability, notably in roll.

FIG. 7 represents a radial blower 2 of the preceding type described with reference to FIG. 6 and an air aspiration structure that surmounts it. This aspiration structure is inclined from top to bottom and from back to front of the support structure 3, to be directed in the direction of movement of the aerodyne, and includes an array of blades 10 bearing on the perimeter of the aspiration opening $2a$ formed in the upper wall of the casing of the blower 2. This array of blades 10 has the two-fold advantage of orienting downward the horizontal relative airflow resulting from the forward speed $\vec{V}cr$ of the aerodyne, which is favorable to the aspiration of the blower 2, and, on this airflow passing over the deflector blades ( . . . , $10i$, $10(i+1)$, . . . ) of this array, contributing to the lift of the aerodyne by exerting, as shown in the detail view of FIG. 7a, a sum of vertical forces ( . . . , fl(i), fl(i+1), . . . ) which, in total and in the aforementioned example, may represent the equivalent of the weight of the engine driving the blower 2.

Each blade 10 of the slatted array or grille over the airflow aspiration opening $2a$ is configured with a high-camber (more than 5%) airflow profile to generate lift by circulation of the airflow around these profiles.

Figure 8A:
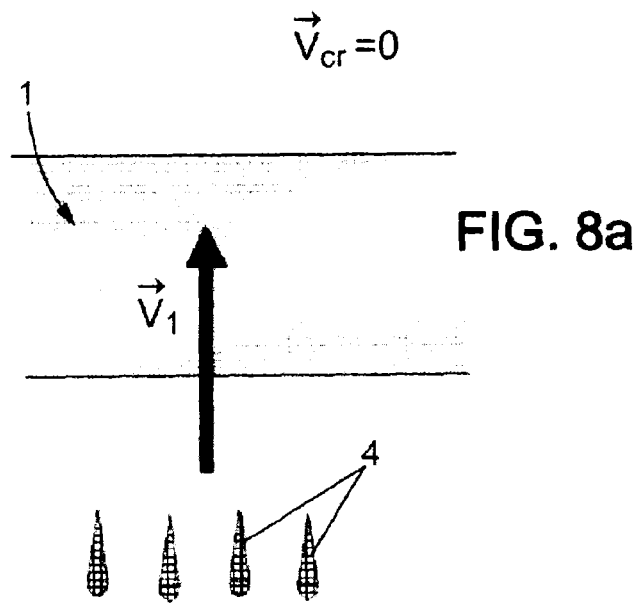
FIGS. 8a and 8b are diagrammatic plan views of the outflow of air over a longitudinal airfoil, respectively in a vertical take-off configuration, in FIG. 8a, and in a cruising flight configuration with a forward speed $\vec{V}$cr, in FIG. 8b.
Figure 8B:
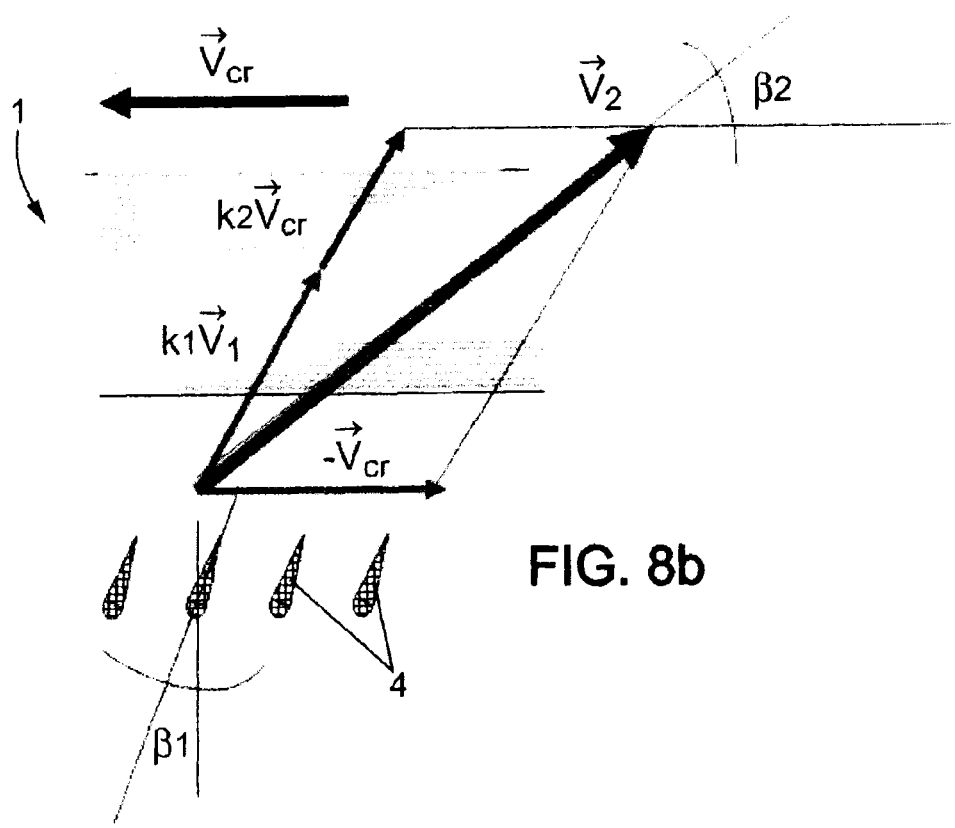

FIGS. 8a and 8b are particularly important because they show, as seen from above, the transition between vertical flight and horizontal flight. In these Figures, the airflow blown toward a longitudinal airfoil 1 with a speed $\vec{V}1$ passes through, at the level of the lateral vents such as 33 and 34 in FIG. 5, the slatted grille 4 (see FIG. 4) for orienting the flow, which serves to orient the airflow toward the front or toward the rear of the aerodyne, then circulates transversely over and under the profile of the airfoils 1, oriented substantially parallel to the roll axis X. FIG. 8a shows the situation in the vertical take-off or landing phase. In this case the cruising speed $\vec{V}cr$ is zero, the blades 4 are parallel to the pitch axis Y, and the air exit speed $\vec{V}1$ is perpendicular to the airfoil 1 and to the roll axis X. FIG. 8b shows the same situation in horizontal flight of the aerodyne at the non-zero speed $\vec{V}cr$, retaining all the motive power. The blades 4 are inclined toward the rear of the aerodyne at an angle β1. The speed $\vec{V}2$ of the airflow to which the airfoil 1 is subjected is then the resultant of a sum of two vectors:

1. one parallel to the axis of movement or roll axis X is equal to $-\vec{V}cr$,
2. the other, oriented transversely in a direction at an angle β1 to the pitch axis Y, is equal to the sum:
   a. of the speed ($k1\vec{V}1$), where $\vec{V}1$ is the preceding speed and k1 is a coefficient that results from the work of the engine; k1 has the value 1 if the same motive power is retained as in the situation of vertical take-off, and 0 if no motive power is introduced into the blower 2; and
   b. a vector ($k2\vec{V}cr$), where k2 is a coefficient substantially in the range 0.7 to 1 that principally takes into account head losses in the circulation of the flow through the entry blades 10 of the FIG. 7 aspiration structure and/or the diffuser vanes $2g$ in FIG. 6, the blower 2 and the passages $3c$. Incoming air captured, where applicable, at the level of the grille of blades 10 in FIG. 7 retains the greater part of its energy (enthalpy) while crossing the blades 10 and/or vanes $2g$, if present, the blades $2b$ of the blower 2 and the passages $3c$, if this system is well designed from the aerodynamic point of view, and this incoming air therefore leaves via the vents such as the vents 33 and 34 in FIG. 5, with the same speed $\vec{V}cr$ as its entry speed, to which is applied an efficiency coefficient k2 linked to the head losses.

The angle β1 is an angle chosen by the flight control system, which manages the transition between vertical flight and horizontal flight. Under these operating conditions, three remarks are called for.

1. The speed $\vec{V}2$ seen by the airfoil 1 depends on the angle β1, but is anyway significantly greater than $\vec{V}1$, notably when $\vec{V}cr$ is of the order of $\vec{V}1$, or even greater.
2. The oblique direction at angle β2 of the resultant $\vec{V}2$ relative to the roll axis X means that the coefficient Kl of the profile of the airfoil 1, seen at this angle β2, is substantially less than (for example half) what it is in the vertical take-off or landing configuration (with $\vec{V}2=\vec{V}1$ perpendicular to the airfoil 1 and the roll axis X).
3. The lift in horizontal flight being proportional to the product of the square of the speed and the coefficient Kl is in fact greater than or equal to what it is in vertical flight.

In total, this means that, in horizontal flight, a reserve lift is available, which is a favorable situation, and that it suffices, to manage this surplus lift, to reduce the driving load and/or to orient part of the airflow, notably that leaving the vents 35 (see FIG. 5) situated at the rear of the aerodyne, toward the rear to be used as propulsive force.

It should be noted here that the aerodyne may also include ordinary wings which, although they are not represented in the Figures, can take over from the longitudinal airfoils to provide the lift from a particular speed in horizontal flight. With or without these ordinary wings, at a low or zero forward speed $\vec{V}$cr the lift and propulsion device and thus the aerodyne equipped with it may be sensitive to crosswinds (or side winds), the speed of which is added to the speed of blowing an airfoil 1 on one side of the support structure 3, and subtracted from the speed of blowing of the airfoil 1 on the other side of the aerodyne, and thus significantly unbalances the lift exerted on the airfoils 1, with the result that such an aerodyne is particularly appropriate for use during favorable meteorological conditions, without violent winds or gusts of wind.

Figure 9:
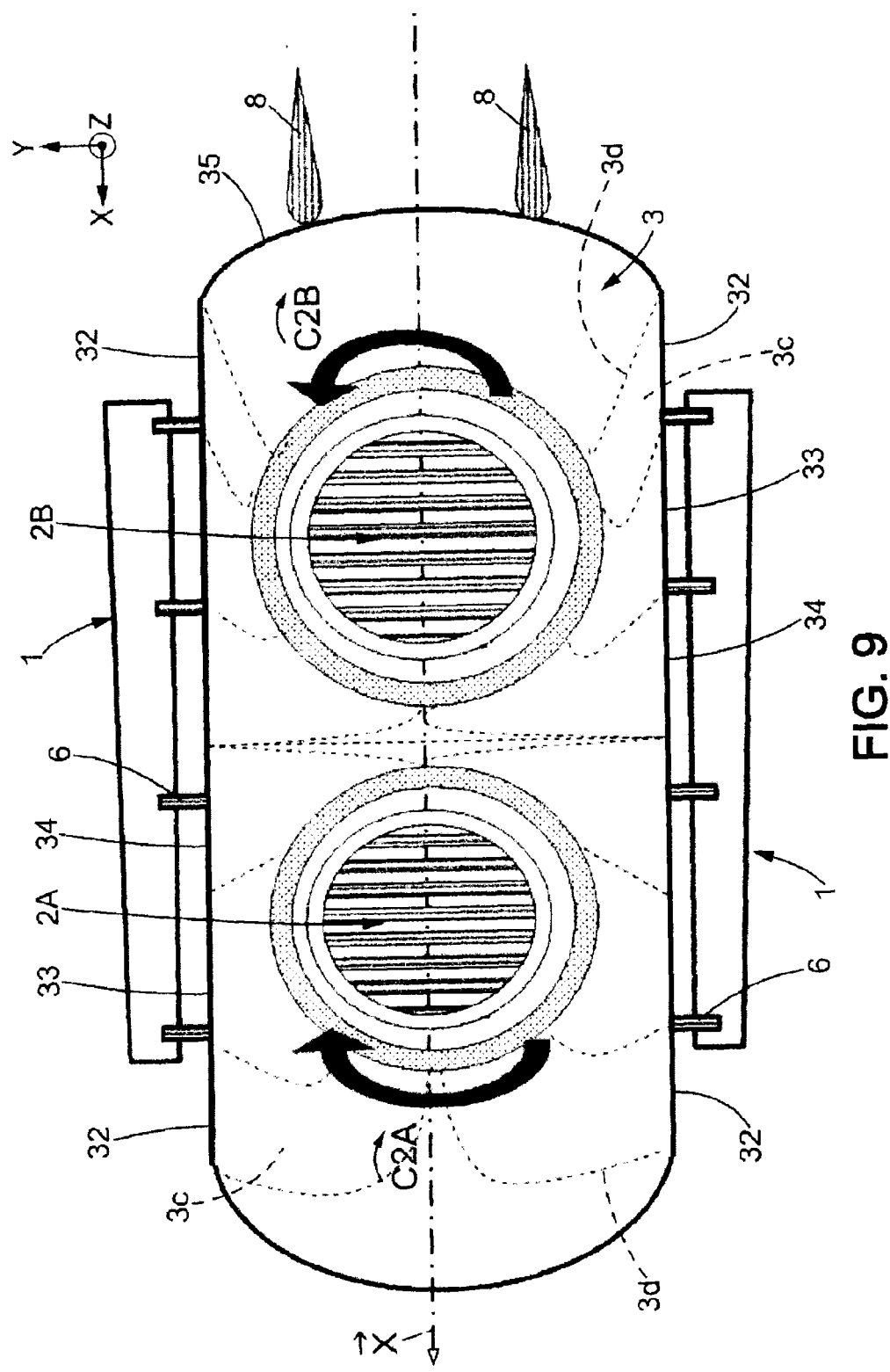
FIG. 9 is a diagrammatic plan view analogous to that of FIG. 5 of a lift/propulsion device and an aerodyne of the invention with two contra-rotating blowers.

FIG. 9 shows another variant of the device of the invention, which includes two longitudinally spaced blowers 2A and 2B centered on the roll axis X. This device is particularly interesting in that, with the same engine (or pair of engines) such as the engine 21 in FIG. 3, two blowers 2A and 2B may be driven that turn in opposite directions, with identical torque values C2A and C2B, which therefore cancel out (C2B=−C2A). Moreover, in cruising flight at $\vec{V}$cr, the first blower 2A, which is preferably a radial blower, may be used as explained above with reference to FIGS. 8a and 8b, and simply compensate head losses (in this case k1=0 and k2=1); this first blower 2A therefore consumes very little power, whilst providing the lift for the aerodyne, and most of the motive power is absorbed by the second blower 2B, which is preferably of the axial type and is essentially dedicated to propulsion of the aerodyne, and installed in the support structure 3 so that its axis is inclined from top to bottom and from back to front of the aerodyne, at an angle of approximately 30° to the yaw axis Z, in the vertical plane defined by the roll axis X and the yaw axis Z.

By comparison with the FIG. 5 example, it is seen that the front blower 2A (on the roll axis X and in the front half of the support structure 3) feeds symmetrically with respect to the plane of the roll axis X and the yaw axis Z lateral vents 32, 33 and 34 on each side, just in front of the forward end of the two airfoils 1, or toward each of the two longitudinal airfoils 1, thanks to the internal partitions 3d delimiting passages 3c between the top wall 3a and the bottom wall 3b of the support structure 3, while the rear blower 2B feeds not only lateral vents 34, 33 and 32 on each longer side of the support structure 3, toward the airfoils 1 or just aft of the aft end thereof, but also the rear vents 35 providing the propulsion.

Alternatively, to prevent failure of one of the two blowers 2A and 2B feeding to an airflow failure of substantially the corresponding half of the lateral vents 33 and 34 essential for lift, the passages 3c delimited by the internal partitions 3d may be provided at one of two different levels, along the yaw axis Z, for the two blowers 2A and 2B, respectively, so that each of them may alone contribute to supplying to each of the lateral vents 33 and 34 for blowing the airfoils 1, in order to develop at least sufficient lift to enable vertical or short landing with a vertical speed sufficiently limited not to damage the aerodyne.

In this configuration in particular, although not exclusively, to prevent the airflow coming from one of the two blowers 2A and 2B essentially sweeping the extrados of the airfoils 1 while the airflow coming from the other of the two blowers essentially sweep the intrados of the airfoils 1, each of the airfoils may be a multi-plane airfoil including a plurality of airfoil elements offset relative to each other both along the yaw axis Z and along the pitch axis Y, and, in particular, each longitudinal airfoil 1 may be a two-plane airfoil in which the plane below the other plane (on the axis Z) is also the inner one (nearer the support structure 3) of the two airfoil elements with cambers in the same direction, and possibly "parallel". Alternatively, multiplane airfoils 1 may also be associated with a single lift blower 2.

Another alternative is for the two blowers 2A and 2B to be identical radial contrarotating blowers, dedicated only to lifting the aerodyne. In this case, the device includes few if any vents blowing toward the rear such a the vent 35 (see FIG. 9) for propulsion, which is provided by at least one distinct propulsion unit, such as at least one ducted-fan mounted at the front or at the rear on the support structure 3 and dedicated to propulsion in substantially horizontal flight, which fan or fans may equally be driven in rotation by the motor driving the blowers 2A and 2B, preferably in this case with a progressive transfer of motive power from the blowers 2A and 2B, or at least the front blower 2A, providing the lift, to the propulsion fans, during the transition from vertical flight to horizontal flight, and the phase of acceleration in horizontal flight, or by at least one engine dedicated to driving the propulsion unit or distinct propulsion units.

There may be considered by way of example lifting an aerodyne for manipulating heavy loads, the approximate dimensions of which are 4 m wide (along the pitch axis Y) by 11 m long (along the roll axis X), for the dimensions of the support structure 3, in an aerodyne category of mass greater than 5000 kg, with two blowers 2A and 2B, as described above with reference to FIG. 9, where the peripheral speed of rotation of each blower is of the order of 150 m/s and the outflow radial speed is of the order of 50 m/s. The diameter of each individual blower 2A or 2B is approximately 3.5 m (i.e. more than 80% of the width of the structure), and the height of the blades 2b of the blowers is approximately 44 cm and substantially corresponds to the height of the vanes 2g of the associated diffuser, if any. The airflow generated is sent to the sides and to the rear of the support structure 3 via outlet vents, such as the vents 32, 33, 34 and 35, approximately 40 cm high, and, in particular, the airflow is directed over the two longitudinal airfoils 1 each of which is approximately 10 m long and 2 m wide, on the right-hand and left-hand sides of the support structure 3, and offering a lift coefficient Kl in the range 2.5 to 4. The lift force generated, which corresponds to the maximum mass of the aerodyne on take-off, is then greater than 16 000 kg and the power of the engine or engines 21 of the order of 2000 kW.

The length along the roll axis X of each of the two longitudinal airfoils 1 and the length of the support structure 3 necessarily having to be limited, a good compromise between this necessary length limitation and optimizing the head losses in the lateral passages 3c for feeding airflow to the lateral vents for blowing the airfoils 1 consists, in particular when the device comprises one or two radial or axial blowers 2 or 2A, 2B, in adopting a length of each longitudinal airfoil 1 that is substantially equal, to within ±20%, to $$\frac{n}{2}$$

times the circumference of a blower, n being the number of blowers of substantially the same diameter in the device.

In the example just described hereinabove, each of the two longitudinal airfoils 1 has a length of approximately 10 m and each of the two blowers 2A and 2B has a diameter of approximately 3.5 m, which corresponds to a circumference of substantially 11 m for each blower, which complies with the conditions stated above.

FIG. 10 shows a particular arrangement and a particular disposition of a longitudinal airfoil 1, having in this example two cambered airfoil elements consisting of a trailing edge element with a short chord separated by a slot from the main airfoil element, relative to the support structure 3 and to the deflector blades 5 which are controlled to orient the outlet airflow upward or downward (along the yaw axis Z), as described with reference to FIGS. 4 and 4a.

In a manner that is not represented in FIG. 10, the airfoils 1 may be rigidly fixed to the support structure 3 by connecting means 6 such as those described with reference to FIG. 4a, for example, or, alternatively, fixed to an intermediate cradle (not represented) enabling the airfoils 1 as a whole to pivot about the roll axis X or an axis parallel thereto in order to be able to lock the angle of incidence of the airfoils 1 to an angular value that may be adjusted over a particular range, the cradle also enabling the whole of the airfoils 1 to pivot also, with an analogous amplitude, around the pitch axis Y or an axis parallel thereto, and also around the yaw axis Z or an axis parallel to the latter to lock the airfoils 1 in a more favorable position in horizontal flight, in which the airfoils 1 are attacked by the relative airflow in the general direction of their length. The longitudinal airfoils 1 are thus connected to the support structure 3 by the cradle, or slightly mobile attachments, enabling them to assume any angle between −10° and +10°, for example, relative to a reference plane XY and/or XZ and/or YZ.

In FIG. 10, the blades 5 each commanded to pivot about an axis parallel to the roll axis X, in a lateral vent for blowing the corresponding airfoil 1, immediately downstream of the deflector blades 4 and between the upper wall 3a and the lower wall 3b of the support structure 3, deflect the exit airflow slightly upward, at an angle γ1, so that the airfoil 1 which, in FIG. 4 as in FIG. 1, has an angle of incidence α1 with respect to the airflow, has in FIG. 10 an angle of incidence α1−γ1. This arrangement and this disposition are favorable in that they enable the resultant $\vec{F}$ of the aerodynamic forces exerted on the airfoil 1 to be moved closer to the vertical, and thus to increase the effective lift (since $\vec{F}$ is the sum of the lift force $\vec{F}l$ and the drag force $\vec{F}d$, so that if $\vec{F}d$ is large, $\vec{F}$ is significantly larger than $\vec{F}l$).

The orientation of the outflow of air from a lateral vent 33 or 34, upward at an angle γ1, preferably in the range 10° to 45°, exerts a downward impulse force on the support structure 3, which is therefore subtracted from the lift developed on the airfoils 1, but the balance remains very largely positive, because the resultant $\vec{F}$ of the forces is generally significantly greater than the lift force $\vec{F}l$.

FIG. 11 represents a variant of the device of the invention in a malfunction situation in which the device and the aerodyne equipped with it are in free fall, for example in the event of engine failure. In this case, as already mentioned hereinabove, the blades 2b of the blower or blowers 2A and 2B and the deflector vanes 2g are pivoted to close the passages between them in order to preserve the kinetic energy of the rotor of the blower 2 and the flywheel 2i, as described for the FIG. 6 example, and these blades 2b and vanes 2g are reactivated, i.e. driven again to open the passages between them, on approaching the ground, to generate, using the stored kinetic energy, an airflow incident on the airfoils 1 for braking the fall. In the FIG. 11 variant, traps 36, of which only one is represented in FIG. 11, are also provided in the lower wall 3b of the support structure 3 and pivoted at 37 to this lower wall or floor 3b in the part of this lower wall 3b that delimits the passages 3c, downstream of the deflector vanes 2g of the corresponding blower 2, and directly upstream of the slatted grilles of deflector blades 4 and 5 in the corresponding lateral outlet vent for the airflow blowing the airfoils 1, the pivot axis 37, substantially parallel to the roll axis X, of each trap 36 being upstream of the trap 36 relative to the normal direction of the airflow, so that the traps 36, because of the pressure of the vertical airflow $\vec{V}z$ because the device and the aerodyne are falling, will open by pivoting toward the interior of the passages 3c and enable additional circulation of air over the airfoils 1 to brake the fall of the aerodyne and its lift and propulsion device.

Thus the traps 36 enable recovery of part of the airflow corresponding to the upward vertical relative airflow $\vec{V}z$ to convert it into an additional blowing airflow, which contributes to generating increased lift on the airfoils 1 to brake the fall of the aerodyne.

Figure 12A:
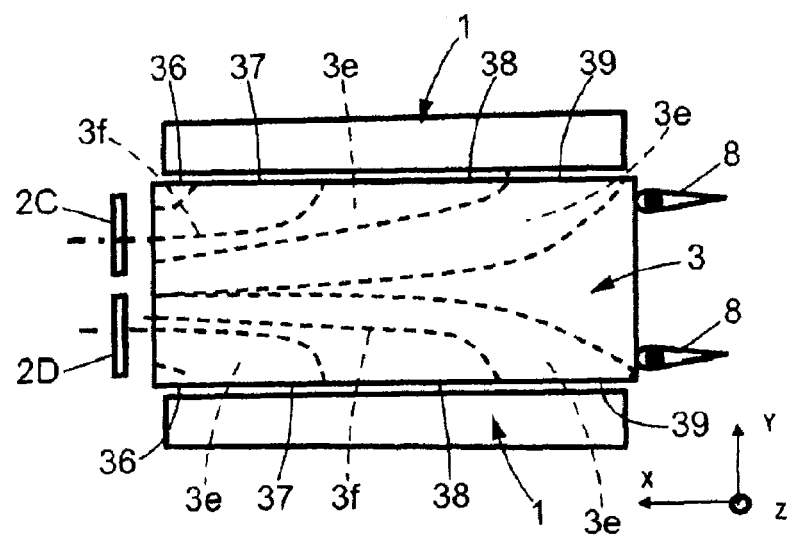
FIGS. 12a and 12b are diagrammatic views respectively in plan and in lateral elevation from the front of another example of an aerodyne of the invention equipped with two axial blowers mounted at the front of the support structure to provide lift and propulsion.
Figure 12B:
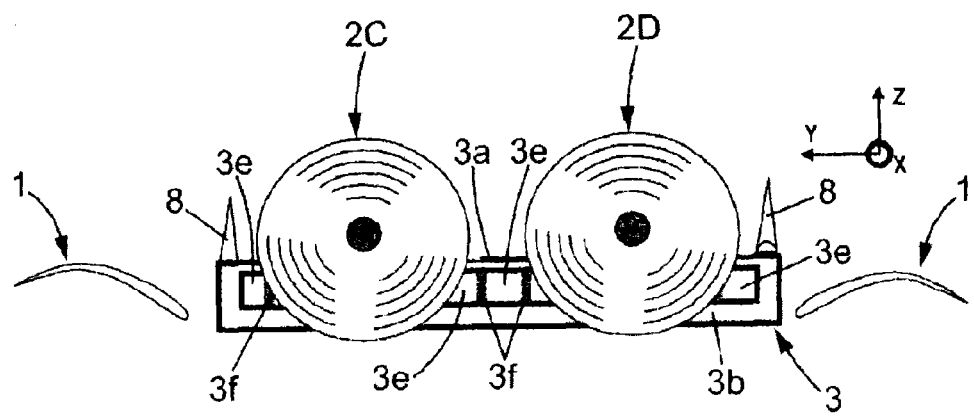

In the variant of the device of the invention shown in FIGS. 12a and 12b, two identical axial blowers 2C and 2D with axes parallel to the roll axis X of the aerodyne and the support structure 3 are mounted at the front of the support structure 3, symmetrically to each other on either side of the longitudinal median plane defined by the roll axis X and the yaw axis Z. These two blowers 2C and 2D are, for example, produced in the form of two ducted propulsion fans, the shrouds of which are fixed in a slightly cantilevered manner in front of the support structure 3, of substantially rectangular shape and supporting two steerable rudder units 8 at the rear.

Part of the axial airflow from the two blowers 2C and 2D is captured axially in the entry of angled passages 3e delimited by partitions 3f curved laterally between the top wall 3a and bottom wall 3b (or floor) of the support structure 3, these angled passages 3e directing the captured airflow laterally and discharging laterally into the two longer sides of the structure 3 via lateral vents 36, 37, 38 and 39 delivering airflow for blowing the longitudinal airfoils 1, on either side of the structure 3, to generate a lift added to that developed by the airfoils 1 because of the longitudinal relative airflow resulting from the propulsion fraction of the airflow produced by the two axial blowers 2C and 2D, and which is the fraction uncaptured by the passages 3e on an aerodyne which, in this case, is more of the STOL type than the VTOL type.

The engine or engines driving the blowers 2C and 2D are not represented to clarify the drawing, but may be mounted in a hold fixed underneath the support structure 3, as in FIG. 3.

For an aerodyne of low mass, such a device may include only one axial blower.

Passages such as the passages 3e for capturing the axial airflows reoriented as lateral flows blowing the airfoils 1 may also be provided in the support structures 3 of the examples of devices from FIGS. 3 to 7 and 9 to 11, above or below the passages 3c delimited by the partitions 3d and fed by the blower 2A and/or the blower 2B. In this case, in the phase of transition from vertical flight to horizontal flight, and in the phase of acceleration in horizontal flight, the motive power used for lift may be progressively transferred to propulsion power, so that little or no power is absorbed by the blowers essentially dedicated to lift and supplied by their motors. In cruising flight, propulsion absorbs practically 100% of the motive power and lift is provided without consumption of additional power, by capture of at least one axial airflow reoriented laterally to blow the airfoils 1.

Figure 13:
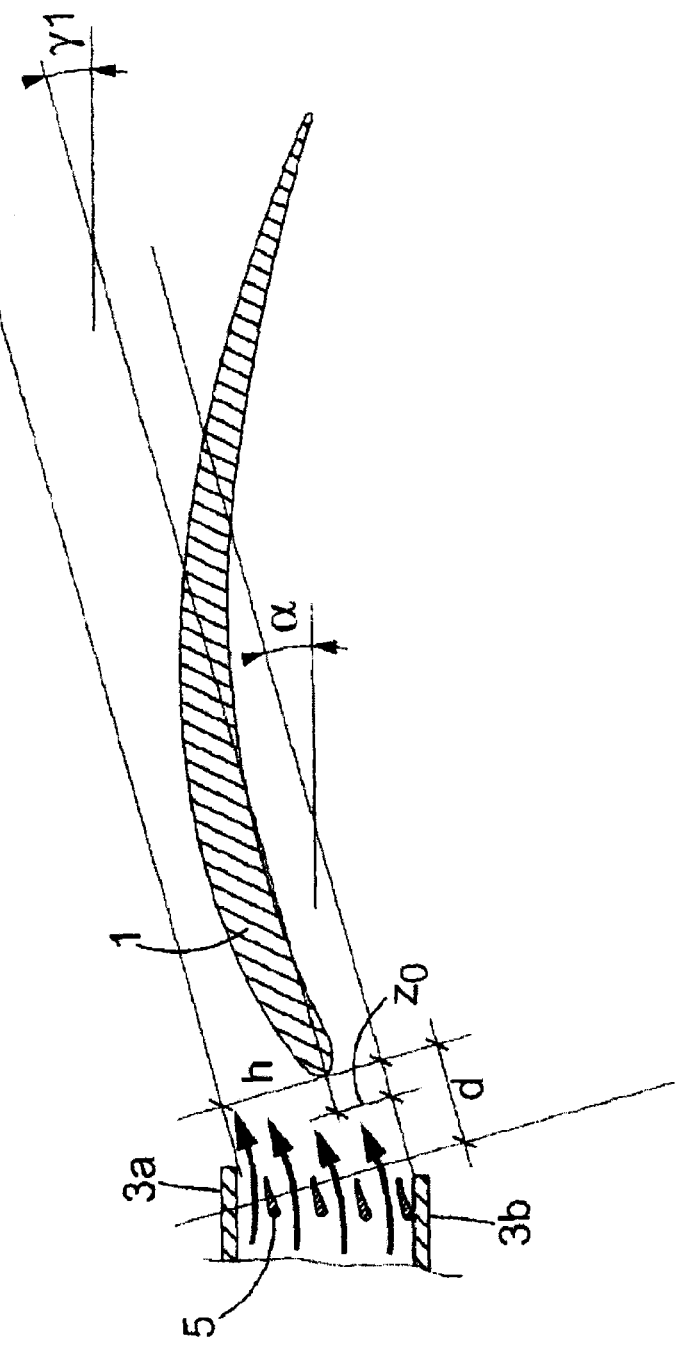
FIG. 13 is a diagrammatic view in cross section of an arrangement and a disposition that are very advantageous aerodynamically of a longitudinal airfoil facing the corresponding edge of the support structure.

FIG. 13 shows diagrammatically in cross section on a plane parallel to the plane defined by the pitch axis Y and the yaw axis Z a particularly advantageous disposition of a longitudinal airfoil 1, in this example with only one cambered airfoil element, relative to the facing lateral edge of the support structure 3, substantially as represented in FIG. 10. In the advantageous disposition of FIG. 13, h designates the height (or thickness) of the airflow leaving a lateral vent delimited between the lateral edges of the upper wall 3a and the lower wall 3b, and deflected by an angle γ1 by the slatted grille 5 disposed in this vent, the angle α being the angle of incidence of the airfoil 1 in the direction of the flow. The distance between the leading edge of the airfoil 1 and the output section of this vent, perpendicular to the diverted flow direction, parallel to the height h, is designated d, and z0 designates the altitude of the extreme point corresponding to the leading edge of the airfoil 1, in the deflected flow of height h. In the favorable disposition of FIG. 13, the following two conditions are satisfied:

$$1)\ 0 \leq \frac{z0}{h} \leq 0.5 \text{ and}$$

$$2)\ 0 \leq d \leq 10\ h.$$

Complying with these conditions enables optimum blowing of the longitudinal airfoils 1.

The invention claimed is:

1. A lift and propulsion device for a vertical or short take-off and landing aerodyne, by the effect of lift obtained by blowing an airflow produced by an airflow generator over lift airfoils connected to a support structure, the device comprising two substantially rectilinear longitudinal airfoils disposed on either side of said support structure and substantially parallel to a roll axis of the device, said two longitudinal airfoils being symmetrical to each other with respect to a plane defined by said roll axis and a yaw axis, wherein each longitudinal airfoil has a length along said roll axis which is at least equal to the sum of the blower diameter for the total amount of blowers, wherein generatrices of the lifting surfaces of said longitudinal airfoils are substantially rectilinear and substantially parallel to said roll axis or slightly inclined to said roll axis, and wherein said airflow generator comprises at least one blower having an axis which is vertical or at a maximum angle of substantially 30° to said yaw axis, mounted in said support structure, with a maximum diameter that corresponds to an extreme rotation diameter of blower blades, and which is more than 50% of the width of said support structure.

2. The device according to claim 1, wherein said support structure has, in the direction of forward cruising flight, which is the direction of said roll axis, a length greater than said width, in the direction of a pitch axis of the device, and the length of said support structure is preferably greater than twice its width.

3. The device according to claim 1, wherein said longitudinal airfoils are connected to said support structure in such a way that said airfoils assume any angle from −10° to +10° relative to a plane defined by two of said roll axis, pitch axis and a yaw axis of the device.

4. The device according to claim 3 wherein said longitudinal airfoils and at least one structural element that connects them to said support structure form a rigid assembly that may be locked with respect to an articulation axis parallel to or coinciding with said roll axis or an articulation axis parallel to or coinciding with a pitch axis.

5. A vertical or short take-off and landing aerodyne, comprising a support structure supporting a lift and propulsion device comprising an airflow generator and two substantially rectilinear longitudinal airfoils disposed on either side of said support structure and substantially parallel to a roll axis of the device, said two longitudinal airfoils being symmetrical to each other with respect to a plane defined by said roll axis and a yaw axis, wherein said airflow generator comprises at least one blower having an axis which is vertical or at a maximum angle of substantially 30° to said yaw axis, mounted in said support structure, with a maximum diameter that corresponds to an extreme rotation diameter of blower blades, wherein each longitudinal airfoil has a length along said roll axis which is at least equal to the sum of the blower diameter for the total amount of blowers, and which is more than 50% of the width of said support structure, said device being supported in an upper part of said support structure, which is fitted out, in a lower part, as a nacelle accommodating a driving system and disposed between said two longitudinal airfoils of said device.

* * * * *